US012791250B2

(12) United States Patent
Bolis et al.

(10) Patent No.: US 12,791,250 B2
(45) Date of Patent: Nov. 10, 2026

(54) SYSTEMS FOR BLAST CELL OPTIMIZATION SCHEDULING

(71) Applicant: LINEAGE LOGISTICS, LLC, Irvine, CA (US)

(72) Inventors: Nadia Bolis, Berkeley, CA (US); John Richardson Crawford, Raleigh, NC (US); Jason Dyer, Irvine, CA (US); Richard Kulp, Green Lane, PA (US); Glenn Canavan, Brooklyn, NY (US); Niki Dirksen, Denver, CO (US)

(73) Assignee: Lineage Logistics, LLC, Irvine, CA (US)

( * ) Notice: Subject to any disclaimer, the term of this patent is extended or adjusted under 35 U.S.C. 154(b) by 0 days.

(21) Appl. No.: 19/212,372

(22) Filed: May 19, 2025

(65) Prior Publication Data

US 2025/0362077 A1 Nov. 27, 2025

Related U.S. Application Data

(60) Provisional application No. 63/650,051, filed on May 21, 2024.

(51) Int. Cl.
*G05B 17/02* (2006.01)
*F25D 29/00* (2006.01)

(52) U.S. Cl.
CPC ............. *F25D 29/00* (2013.01); *G05B 17/02* (2013.01); *F25D 2400/30* (2013.01); *F25D 2600/02* (2013.01)

(58) Field of Classification Search
USPC ........................................................ 700/300
See application file for complete search history.

(56) References Cited

U.S. PATENT DOCUMENTS

| | | | | |
|---|---|---|---|---|
| 7,706,923 B2 * | 4/2010 | Amundson | ............ F24F 11/523 | 700/83 |
| 2009/0090127 A1 * | 4/2009 | Do | ........................ F25D 23/028 | 62/449 |
| 2010/0070089 A1 * | 3/2010 | Harrod | ...................... G06F 8/34 | 700/277 |

(Continued)

OTHER PUBLICATIONS

Manoharan et al. "Learn to chill—Intelligent Chiller Scheduling using Meta-learning and Deep Reinforcement Learning", ACM DL, Nov. 2021, p. 21-30. (Year: 2021).*
Chourot et al., "Technical and economical model for the freezing cost comparison of immersion, cryomechanical and air blast freezing processes", Energy Conversion and Management 44:4 (Mar. 2003): 559-571.
Dempsey et al., "The art of air blast freezing: Design and efficiency considerations", Applied Thermal Engineering 41 (Aug. 2012): 71-83.

(Continued)

*Primary Examiner* — Hien D Khuu
(74) *Attorney, Agent, or Firm* — Barnes & Thornburg LLP

(57) ABSTRACT

Described are systems and methods for determining a blast freezing optimization schedule. A system can include: a blast cell to receive items for cooling, a refrigeration control system (RCS) to control the blast cell, and a computer system that can perform operations including: receiving, from at least one of the RCS and a warehouse management system (WMS), storage facility data, determining a blast schedule for the blast cell based on applying a simulation model to the storage facility data that was trained to generate the blast schedule based on determining that a blast cell cost per pallet maximizes a blast profit margin for the storage facility by at least a threshold amount, and returning the blast schedule to cause the RCS to automatically control the blast cell according to the blast schedule.

9 Claims, 18 Drawing Sheets

(56) References Cited

U.S. PATENT DOCUMENTS

| | | | | |
|---|---|---|---|---|
| 2010/0179708 | A1* | 7/2010 | Watson | H02J 13/1323 700/296 |
| 2014/0358287 | A1* | 12/2014 | Lee | F25D 29/00 700/275 |
| 2016/0073555 | A1 | 3/2016 | Shrivastava et al. | |
| 2016/0238308 | A1* | 8/2016 | Uchida | F25D 17/065 |
| 2018/0228060 | A1 | 8/2018 | Alissa et al. | |
| 2019/0045817 | A1 | 2/2019 | Woolf et al. | |
| 2019/0075687 | A1 | 3/2019 | Brunstetter | |
| 2019/0078833 | A1* | 3/2019 | Graziano | F25D 29/005 |
| 2020/0018540 | A1* | 1/2020 | Hwang | G06N 3/0499 |
| 2020/0334600 | A1* | 10/2020 | Wolf | G06Q 10/06311 |
| 2023/0168022 | A1 | 6/2023 | Walet et al. | |
| 2024/0127139 | A1 | 4/2024 | Wolf et al. | |
| 2024/0168534 | A1 | 5/2024 | Ghose | |

OTHER PUBLICATIONS

International Search Report and Written Opinion in PCT/US2025/030030, dated Jun. 27, 2025, 10 pages.

Jain et al., "NeurOpt: Neural network based optimization for building energy management and climate control", Proceedings of Machine Learning Research 120 (2020): 1-12.

Pearson, Andy, Star Refrigeration Ltd."Calculating Freezing Times in Blast and Plate Freezers", Technical Paper #5, International Institute of Ammonia Refrigeration, (2009), 36 pages.

Scott et al., "Refrigerated Warehouse Demand Response Strategy Guide", Energy Technologies Area, Ernest Orlando Lawrence Berkeley National Laboratory (Nov. 2015), 116 pages.

* cited by examiner

| Product Specs 600 | | |
|---|---|---|
| Pallets / Group | | 1 |
| lbs/pallet | | 1950 |
| Product Type | | Water |
| Product Initial Temp [F] | | 80 |
| Product Final Temp [F] | | 0 |

| Cost Analysis 606 | | |
|---|---|---|
| Total Heat Load [kJ] | | 6,284,933.02 |
| Total Electrical Load [kWh] | | 2483.6 |
| Average Power Draw [kW] | | 34.5 |
| Total Electricity Usage Cost | $ | 73.76 |
| Total Electricity Demand Cost per mo. | $ | 737.15 |
| Total Labor Cost | $ | 1.13 |
| **Total Monthly Cost** | **$** | **1,511.09** |
| **Total Cost per Pallet** | **$** | **146.23** |

| Blast Specs 602 | |
|---|---|
| Is Blast Product | TRUE |
| Blast Time [hrs] | 72 |
| Pallets / Blast | 1 |
| Number of Simultaneous Blast Cells | 1 |
| Booster Fans | 0 |
| hp / Booster Fan | 0 |
| Evaporator Fans | 3 |
| hp / Evaporator Fan [hp] | 10 |
| Evaporator Capacity [tons of refrigeration] | 60 |

| Tonnage Check 604 | |
|---|---|
| Blast Product Tonnage [tons of refrigeration] | 6.89 |
| Rated Evap Capacity [tons of refrigeration] | 60 |
| **Enough Refrigeration?** | **YES** |

FIG. 6

SYSTEMS FOR BLAST CELL OPTIMIZATION SCHEDULING

INCORPORATION BY REFERENCE

This application claims the priority benefit of U.S. Provisional Patent Application No. 63/650,051, filed May 21, 2024, the entirety of which is incorporated herein by reference.

TECHNICAL FIELD

This document generally describes devices, systems, and methods related to computer-automated techniques for determining blast cell optimization schedules and blast cell usage in a facility.

BACKGROUND

Convective air blast freezing is a process by which freezing of items like food or produce is facilitated by flowing very cold air over the items via mechanical force. Such air blast freezing can be typically used for large volumes of items that are carried on pallets. Airflow of thousands of cubic feet per minute (CFM) can be used for freezing. Blast freezing is typically used on perishable foods (e.g., fruits and meats) geographically near their point of initial food processing. Such items may then be stored for a short or long period in a storage facility offering frozen or cold storage, then shipped to a point close to the items' use, such as to a grocery store or a warehouse operated by a particular grocer.

These food items may decay largely because they include water, which when not frozen, is a hospitable environment for bacteria and other pathogens. Blast freezing can prevent this process and thus is employed broadly in the food distribution industry. Blast freezing can be a large and expensive consumer of electricity, natural gas, or other mechanisms needed to operate chillers, fans, and other equipment required to perform such large-scale cooling.

SUMMARY

The document generally describes technology for optimizing and improving blast freezing processes in a storage facility (e.g., warehouse, distribution center). More particularly, the disclosed technology provides for combining data from various different data sources, including but not limited to a warehouse management system (WMS), refrigeration system, and temperature sensor data, to calculate or estimate blast cell costs, projected costs per pallet (e.g., energy costs, labor costs, operational costs, equipment maintenance costs), and leverage such calculations or estimations to improve efficiency and costs of the blast freezing processes. Accordingly, the disclosed technology may be used to generate and/or adjust blast freezing processes for blast cells in the facility as well as control components in the facility to perform operations or other tasks associated with the adjusted blast freezing processes. The disclosed technology can also be used to generate and update in real-time or near real-time dashboards and/or portals presented in graphical user interface (GUI) displays of relevant users' computing devices. The dashboards (e.g., portals) can provide visibility into blast freezing processes and trends for the facility. The dashboards may be used by the relevant users to adjust or schedule the blast freezing processes in the storage facility in such a way that allows for reducing inefficiencies and streamlining the blast freezing processes for the storage facility.

One or more embodiments described herein can include a system for controlling a blast cell based on a blast freezing optimization schedule, the system including: a blast cell that can be configured to receive items to be cooled, a refrigeration control system (RCS) having a controller that can be configured to control operation of the blast cell to cool the items received in the blast cell, and a computer system in communication with the RCS. The computer system can be configured to perform operations that may include: receiving storage facility data, determining a blast schedule for the blast cell based on applying a simulation model to the storage facility data, the simulation model having been trained to generate the blast schedule based on determining that a blast cell cost per pallet maximizes a blast profit margin for the storage facility by at least a threshold amount, where the blast profit margin can be a numeric value that indicates blast freeze operation efficiencies for a facility, and returning the blast schedule for execution by the controller of the RCS to cause the controller to control components associated with the blast cell according to the blast schedule.

The system can optionally include one or more of the following features. For example, the storage facility data can include energy rates, labor costs, pallet movement data, refrigeration data, and blast cell data. The operations may also include generating activation instructions for the blast cell based at least in part on the storage facility data and transmitting the activation instructions to the RCS. The RCS can be configured to automatically execute the activation instructions to control the blast cell according to the activation instructions. Sometimes, the operations can also include: generating instructions to deactivate the blast cell based on a determination, by the simulation model, that the blast cell cost per pallet maximizes the blast profit margin for the storage facility by less than the threshold amount and transmitting the instructions to a user device for presentation in a graphical user interface (GUI) display. The user device can be configured to: present the instructions with selectable options to (i) perform the instructions and (ii) reject the instructions, receive user input indicating selection of one of the selectable options, and transmit the user input to the computer system for automatic execution.

In some implementations, returning the blast schedule can include transmitting the blast schedule to a computing device of a worker in the storage facility. The computing device can be configured to: output the blast schedule in a GUI display at the computing device, receive user input indicating selection of the blast schedule, and transmit a notification to the computer system indicating the user selection of the blast schedule. The computer system can also perform operations that may include generating instructions to control the blast cell according to the user selection of the blast schedule and returning the instructions to the controller of the RCS to cause the controller to automatically control operations of the blast cell based on the user selection of the blast schedule. Sometimes, the operations can include determining the blast cell cost per pallet based on: receiving time series data that includes, for a past period of time, pallet movement data, changes in temperature data, labor usage data, and energy consumption data, correlating the time series data, determining a cost per pallet over the past period of time based on applying a cost model to the correlated data, and determining the blast cell cost per pallet over a future period of time based on applying a cost projection model to the determined cost per pallet over the past period of time. Determining the blast cell cost per pallet can be further based on multiplying a total kW of compressors in the facility by a cooling capacity of the blast cell during timestamps at which the blast cell is activated.

In some implementations, returning the blast schedule further can include presenting the blast schedule in a GUI display at a user device based on presenting a module designating the blast cell that may include: (i) a countdown timer indicating an amount of time left in a current blast cycle for the blast cell, (ii) an action timer indicating an amount of time that the blast cell can be paused or an action needs to be taken, (iii) a state of the blast cell, the state including at least one of on, off, or defrost, (iv) a product type in the blast cell, (vi) a supply temperature to the blast cell, and (vii) a capacity of the blast cell. The module can also information that further includes a graphical element indicating a warning signal when action may be required for the blast cell. The warning signal can correspond to instructions, that when executed by the controller of the RCS, can cause the controller to (i) control the components to turn off the blast cell or (ii) instruct automated machines in the facility to unload the items from the blast cell. Sometimes, the module can present information that further may include a capacity of the blast cell. The operations can further include: receiving, from scanning devices, product information about the items that are loaded into the blast cell, identifying, based on the product information, a quantity of the items loaded into the blast cell, determining whether the quantity of the items (i) satisfies a minimum threshold capacity for operating the blast cell and (ii) is within a maximum threshold capacity for operating the blast cell, generating instructions for execution by the controller of the RCS to cause the blast cell to begin operating based on a determination that the quantity of the items (i) satisfies the minimum threshold capacity and (ii) is within the maximum threshold capacity, starting the countdown timer based on an indication that the instructions are executed, by the controller of the RCS, and updating, in the GUI display at the user device and in real-time, the countdown timer once the countdown timer starts. Sometimes, the blast cell can include a group of blast cells, and the user device can be configured to present, in another GUI display, a group of the modules. Each of the group of modules can correspond to a respective blast cell amongst the group of blast cells and can be configured to present blast cycle operational information corresponding to the respective blast cell. Sometimes, the simulation model can be further trained to determine the blast schedule based at least in part on (i) a product type and (ii) a packaging material type for each of the items loaded into the blast cell.

One or more embodiments described herein can include a method for controlling a blast cell based on a blast freezing optimization schedule, the method including: receiving storage facility data, determining a blast schedule for the blast cell based on applying a simulation model to the storage facility data, the simulation model having been trained to generate the blast schedule based on determining that a blast cell cost per pallet maximizes a blast profit margin for the storage facility by at least a threshold amount, and returning the blast schedule for execution by a controller to automatically control components associated with the blast cell according to the blast schedule.

The method can optionally include one or more of the following features. For example, returning the blast schedule for execution by the controller can cause the controller to: receive an indication that the blast cell was loaded with items and automatically activate, based on receiving the indication, a cooling unit to turn on the blast cell. Sometimes, returning the blast schedule for execution by the controller can cause the controller to automatically deactivate a cooling unit to turn off the blast cell and instruct automated machines in the facility to remove items from inside the blast cell once the blast cell is turned off. The method can also include determining the blast cell cost per pallet based on: receiving time series data that includes, for a past period of time, pallet movement data, changes in temperature data, labor usage data, and energy consumption data, correlating the time series data, determining a cost per pallet over the past period of time based on applying a cost model to the correlated data, and determining the blast cell cost per pallet over a future period of time based on applying a cost projection model to the determined cost per pallet over the past period of time.

Sometimes, returning the blast schedule further can include presenting the blast schedule in a GUI display at a user device based on presenting a module designating the blast cell that can include: (i) a countdown timer indicating an amount of time left in a current blast cycle for the blast cell, (ii) a state of the blast cell, and (iii) a warning signal when action may be required for the blast cell. The warning signal can correspond to instructions, that when executed by the controller, may cause the controller to (i) control the components to turn off the blast cell or (ii) instruct automated machines in the facility to unload the items from the blast cell. The simulation model can be further trained to determine the blast schedule based at least in part on (i) a product type and (ii) a packaging material type for each of the items loaded into the blast cell.

One or more embodiments described herein can include a system for determining a blast freezing optimization schedule, the system including: a blast cell that can be configured to receive items to be cooled, a refrigeration control system (RCS) including a controller, the controller being configured to control operation of the blast cell to cool the items received in the blast cell, and a computer system in communication with at least the RCS. The computer system can be configured to perform operations including: receiving, from at least one of the RCS or a warehouse management system (WMS), storage facility data, determining a blast cell cost per pallet based on at least a portion of the storage facility data, determining a blast schedule for the blast cell based on applying a simulation model to the storage facility data, the simulation model having been trained to receive, as input, the storage facility data, and output the blast schedule based on determining that the blast cell cost per pallet maximizes a blast profit margin for the storage facility by at least a threshold amount, and returning the blast schedule, where returning the blast schedule can include transmitting the blast schedule to a user device for presentation in a graphical user interface (GUI) display at the user device.

In some implementations, the embodiments described herein can optionally include one or more of the following features. For example, the storage facility data can include at least one of energy rates, labor costs, pallet movement data, refrigeration data, or blast cell data. The operations may also include: generating activation instructions for the blast cell based at least in part on the storage facility data, and transmitting the activation instructions to the RCS, the RCS being configured to automatically execute the activation instructions to cause the controller of the RCS to control the blast cell according to the activation instructions. The operations can also include: generating recommended instructions to deactivate the blast cell based on a determination, by the simulation model, that the blast cell cost per pallet maximizes the blast profit margin for the storage facility by less than the threshold amount, and transmitting the recommended instructions to the user device for presentation in the GUI display. The user device can present the recommended instructions with selectable options to (i) perform the recommended instructions and (ii) reject the recommended instructions, receive user input indicating selection of one of the selectable options, and transmit the user input to the computer system for automatic execution.

Sometimes, returning the blast schedule can include transmitting the blast schedule to a computing device of a worker in the storage facility. The computing device can be configured to: output the blast schedule in a GUI display at the computing device, receive user input indicating selection of the blast schedule, and transmit a notification to the computer system indicating the user selection of the blast schedule. The computer system can perform operations further including: generating instructions to control the blast cell according to the user selection of the blast schedule, and transmitting the instructions to the RCS, where executing the instructions by the RCS can cause the controller of the RCS to automatically control operations of the blast cell according to the blast schedule. Sometimes, the blast cell can include the RCS. Sometimes, determining a blast cell cost per pallet based on at least a portion of the storage facility data can include: receiving time series data from a group of sources for the storage facility, the time series data including, for a past period of time, pallet movement data, changes in temperature data, labor usage data, and energy consumption data, correlating the time series data, determining a cost per pallet over the past period of time based on applying a cost model to the correlated data, and determining the blast cell cost per pallet over a future predetermined period of time based on applying a cost projection model to the determined cost per pallet over the past period of time.

In some implementations, determining a blast cell cost per pallet can be further based on multiplying a total kW of compressors in the facility by a cooling capacity of the blast cell during timestamps at which the blast cell is activated. The blast cell can include the compressors. The cooling capacity of the blast cell can be measured in tonnage.

As another example, presenting the blast schedule in the GUI display at the user device can include presenting a module designating the blast cell, the module presenting information that may include: (i) a countdown timer indicating an amount of time left in a current blast cycle for the blast cell, (ii) an action timer indicating an amount of time that the blast cell is paused or an action needs to be taken, (iii) a state of the blast cell, the state including at least one of on, off, or defrost, (iv) a product type in the blast cell, (vi) a supply temperature to the blast cell, and (vii) a capacity of the blast cell. The module can present information that further includes a graphical element indicating whether the supply temperature or the return temperature exceeds a threshold temperature value for the blast cell. The module can present information that further includes at least one graphical element indicating a warning signal when action is required for the blast cell. The warning signal can provide instructions to turn off the blast cell. The warning signal can provide instructions to unload the items from the blast cell. The warning signal can provide instructions to check the supply temperature to the blast cell. The module can present a graphical element indicating that operations for the blast cell are on track.

In some implementations, the module can present information that further includes a capacity of the blast cell. The computer system can be configured to perform operations further including: receiving, from scanning devices, product information about the items that are loaded into the blast cell, identifying, based on the product information, a quantity of the items loaded into the blast cell, determining whether the quantity of the items (i) satisfies a minimum threshold capacity for operating the blast cell and (ii) is within a maximum threshold capacity for operating the blast cell, generating instructions to cause the blast cell to begin operating based on a determination that the quantity of the items (i) satisfies the minimum threshold capacity and (ii) is within the maximum threshold capacity, starting the countdown timer based on an indication that the instructions are executed to cause the blast cell to begin operating, and updating, in the GUI display at the user device, the countdown timer once the countdown timer starts, the countdown timer being updated in real-time.

Sometimes, the blast cell can include a group of blast cells, and the user device can be configured to present, in another GUI display, a group of the modules. Each of the group of modules can correspond to each of the group of blast cells and can be configured to present blast cycle operational information corresponding to the respective blast cell. The group of modules can be presented, in the another GUI display, in a scrollable grid. In some implementations, the simulation model can be further trained to determine and output the blast schedule based at least in part on (i) a product type and (ii) a packaging material type for each of the items loaded into the blast cell.

The devices, system, and techniques described herein may provide one or more of the following advantages. For example, the disclosed technology provides technical advantages in accessing, synthesizing or aggregating, and homogenizing large sets of data from many different data sources, where each data source may utilize different data schemas, to generate succinct and accurate information about operations in the storage facility. Such generated information can be leveraged by computing systems, such as refrigeration control systems (RCSs) and warehouse management systems (WMSs), to perform lightweight processing and determine efficiency and cost-effectiveness of energy consumption and blast freezing processes in the storage facility. Due to the efficient lightweight processing, the computing systems can determine in real-time or near real-time ways in which energy consumption and the blast freezing processes can be optimized in the storage facility. As a result, components in the storage facility, such as RCSs and fans in blast cells, can be adapted and adjusted to improve efficiencies in the storage facility and reduce labor and energy costs associated with operations in the facility.

The disclosed technology provides technical solutions to technical problems related to inefficiencies in blast freezing operations. The technical solution provided integrates data from many different systems associated with the facility to analyze and optimize blast cell operation as well as calculate operational costs in real-time. The disclosed technology also provides technical solutions to technical problems related to lack of granular visibility into cost breakdowns of blast freezing. The solution provided herein includes dynamic cost modeling that can accurately, efficiently, and lightweight estimate per pallet costs, including energy, labor, and/or maintenance considerations. The disclosed technology provides technical solutions to technical problems related to static or manual scheduling of blast freezing processes, which leads to resource wastage. The solution provided herein can include automated and dynamically adjustable scheduling and control of blast freezing processes based on real-time operational data. Moreover, the disclosed technology provides technical solutions to technical problems related to limited situational awareness for facility operations. The described solution can include real-time dashboards and GUI-based portals that visualize trends and statuses, thereby enabling active monitoring and responsive adjustments to freezing operations in the facility.

In addition to providing numerous technical solutions to technical problems, the disclosed technology also provides improvements to hardware components. For example, the disclosed technology can enhance functionality of existing facility hardware. The disclosed technology enables existing refrigeration and sensor hardware to work together in a new, coordinated way that was not possible without the integration and processing described herein. Moreover, the disclosed technology improves and modifies the operation of control components (e.g., those managing refrigeration cycles) based on dynamic insights, thereby enabling adaptive blast freezing rather than static preprogrammed cycles. The disclosed technology also enables different data-generating systems (WMS, refrigeration units, temperature sensors) to operate cohesively, functioning as a new technical system that provides optimization capabilities beyond any one component alone. The disclosed technology also provides real-time operational analytics hardware and software-especially with GUI/dashboard integration, the disclosed technology turns passive data collection systems into active management tools, thereby allowing human-machine interaction in near real-time with a feedback loop that can be used for controlling and/or informing blast freezing strategies.

As another example, the disclosed technology improves efficiency and cost-effectiveness of storage facilities by increasing throughput of items (e.g., lbs per blast cell per hr) and decreasing energy expenditure (e.g., cost per pound and/or cost per kilowatt of energy over time). Improving the efficiency and cost-effectiveness of the storage facilities may also reduce or otherwise avoid product liability claims or other issues with customers since perishable items can be adequately and timely cooled to avoid spoilage or waste.

The disclosed technology also provides user-interactable dashboards or dashboards that allow for relevant users to not only monitor energy usage and blast freezing trends, but also start/stop blast cycles, pause blast cycles (e.g., due to electrical cost conditions), track scheduled end times of blast cycles, permit algorithms to override blast durations, permit the relevant users to set blast durations, view computer-generated suggested blast durations, store, retrieve, and view historical blast cycles data, and experience further integration with other computing systems and data using APIs. The dashboard(s) can provide various other functionality to the relevant users, including but not limited to displaying status of various blast cells, displaying item status information, displaying and selecting different modes of operation for the blast cells, displaying user-desired visuals of information provided by the RCS and/or WMS, displaying relevant information about key performance indicators (KPIs) for blast cell automation, displaying visuals indicating pounds per cell per hour and/or cost per hour in terms of electrical cost, quantity of manual interventions of blast freezing processes that are made by one or more users, and/or histograms or other visuals of blast times by item identifier (e.g., SKU). The dashboard(s) can therefore provide a unified interface to be used by the relevant users to manage and optimize operations in the storage facility.

Similarly, the disclosed technology can display relevant information and data using a GUI on a display of computing devices of the relevant users in a unique and easy way to understand format. Conventional systems may not provide the disclosed solutions for at least the following reasons: (i) the significant processing power required for to continuously monitor blast freezing processes in many blast cells across many facilities in real-time or near real-time, (ii) the considerable data storage requirements for maintaining information collected and determined by the disclosed technology, and/or (iii) a large enough pool of parameter data to provide accurate thresholds for the disclosed techniques. The GUI dashboards (e.g., portals) described herein can provide information in a manner that can be easily understandable by a human user, viewable on a small or handheld screen, etc. Additionally, translation of outcomes from the complex disclosed technology through the GUIs can improve comprehension of considerable quantities of highly processed data. For example, an exemplary algorithm from the disclosed technology can require: taking inputs from multiple sensors, selecting some data provided by the sensors, ignoring some of the data that was provided by the sensors, performing multiple calculations on a selected subset of the data, combining the data from these multiple calculations and then outputting that data within a short amount of time (e.g., preferably less than a minute), all for multiple relevant users.

The disclosed technology may also require analyzing thousands or more data points to, in real-time or near real-time, identify conditions in different blast cells, parameters for blast freezing associated with different products, and conditions/operational schedules of facilities to generate blast cell operational schedules, recommendations, and/or instructions for presentation in GUIs, then repeat the above operations over a relatively short time period (e.g., every day, every half day, every hour, every 10 minutes, every 5 minutes, every 1 minute) and for many different facilities. Advantageously, these operations can be performed efficiently with computing systems that require minimal compute power and/or resources.

Furthermore, the disclosed technology provides optimization of the facility as a whole, in addition to or instead of blast cell-by-blast cell optimization. A buffer of a predetermined quantity of blast cells can remain open at all times (or predetermined windows of time) to employ energy-saving optimization techniques that delay freezing of an item for some period of time. This buffer can be beneficial to ensure that the facility has sufficient capacity to efficiently handle items that enter the facility without notice for scheduling. Therefore, the facility can continue to provide fresh, non-damaged items to their customers, regardless of how much item traffic occurs at the facility.

The details of one or more implementations are set forth in the accompanying drawings and the description below. Other features and advantages will be apparent from the description and drawings, and from the claims.

BRIEF DESCRIPTION OF THE DRAWINGS

FIG. 6 illustrates example data and metrics used to determine blast cell energy costs per pallet.

Like reference symbols in the various drawings indicate like elements.

DETAILED DESCRIPTION OF ILLUSTRATIVE EMBODIMENTS

This document generally relates to technology for determining blast cell freezing costs (e.g., energy costs, labor costs) and inefficiencies based on a variety of data points in order to optimize or otherwise improve blast cell freezing processes in a storage facility. The disclosed technology also provides customer-facing dashboard(s) or portals for use and interaction by relevant users in order to assess and monitor blast cell freezing trends and adjust the blast cell freezing processes at the storage facility.

Figure 1A:
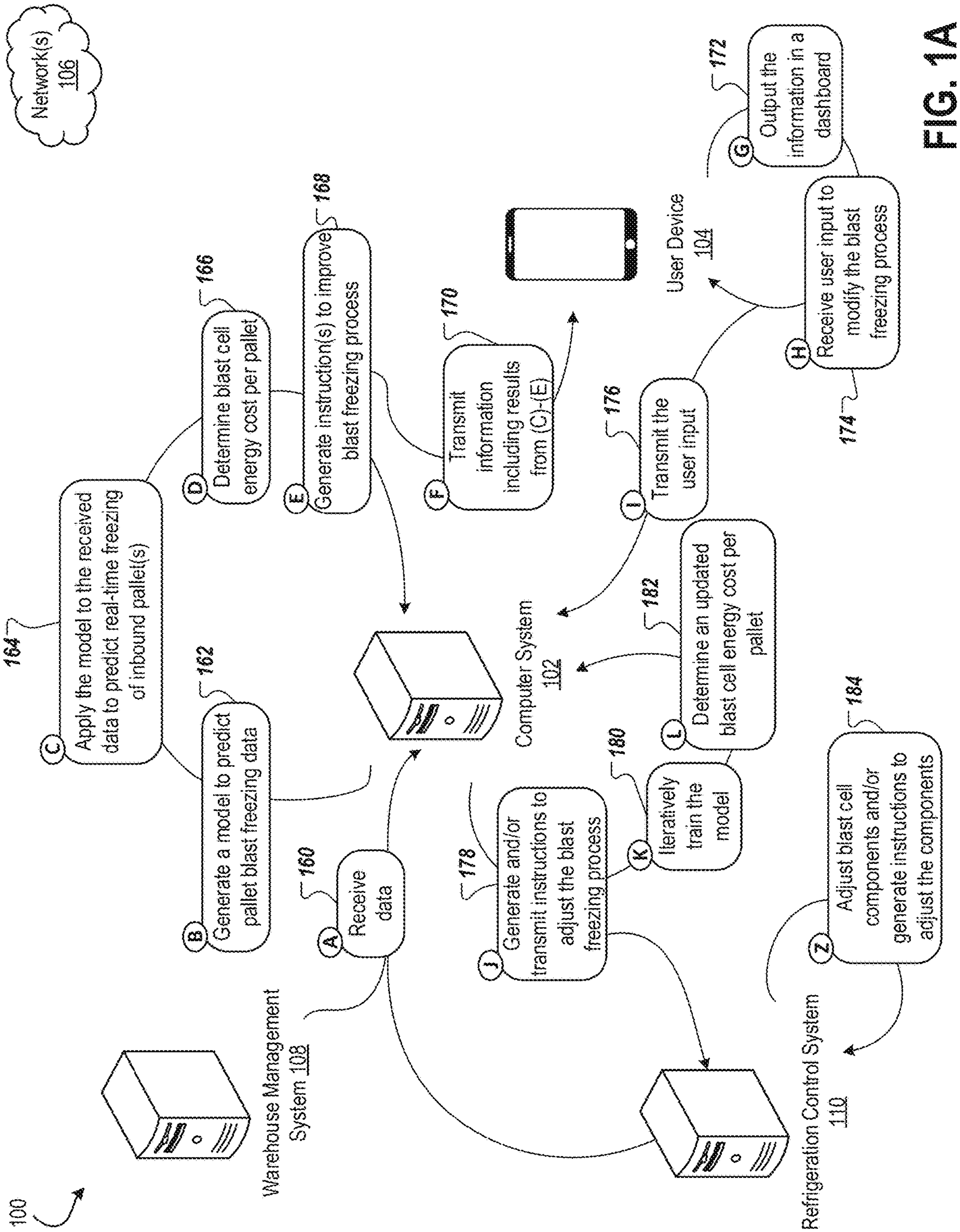
FIG. 1A is a conceptual diagram of a system for determining blast cell optimization information.

Referring to the figures, FIG. 1A is a conceptual diagram of a system 100 for determining blast cell optimization information. The system 100 can include a computer system 102, a WMS 108, an RCS 110, and a user device(s) 104 communicating (e.g., wired and/or wireless) over a network (s) 106. The computer system 102 can be any type of computing system, device, network of systems/devices, and/ or cloud-based system. The computer system 102 can be remote from a storage facility, such as a warehouse. The computer system 102 can be in a particular storage facility. In some implementations, the computer system 102 can perform operations for a plurality of storage facilities. In some implementations, the computer system 102 can perform operations for a particular storage facility. As shown in FIG. 1A, the computer system 102 is separate from the WMS 108, the RCS 110, and the user device 104. In some implementations, any one or more of the systems and devices 102, 108, 110, and/or 104 can be part of a same computer system and/or device.

Figure 7A:
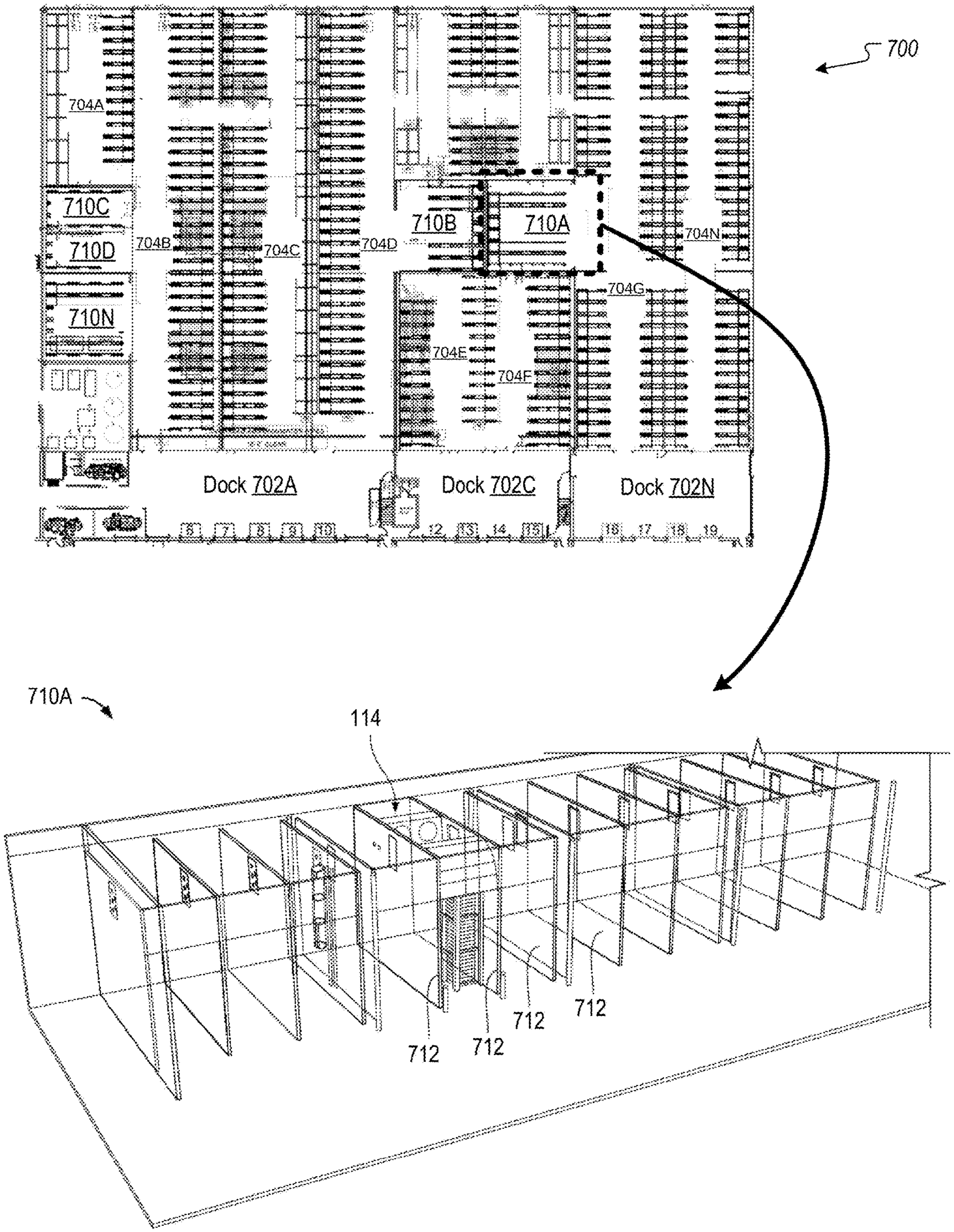
FIG. 7A illustrates an example storage facility layout with blast cells.
Figure 7B:
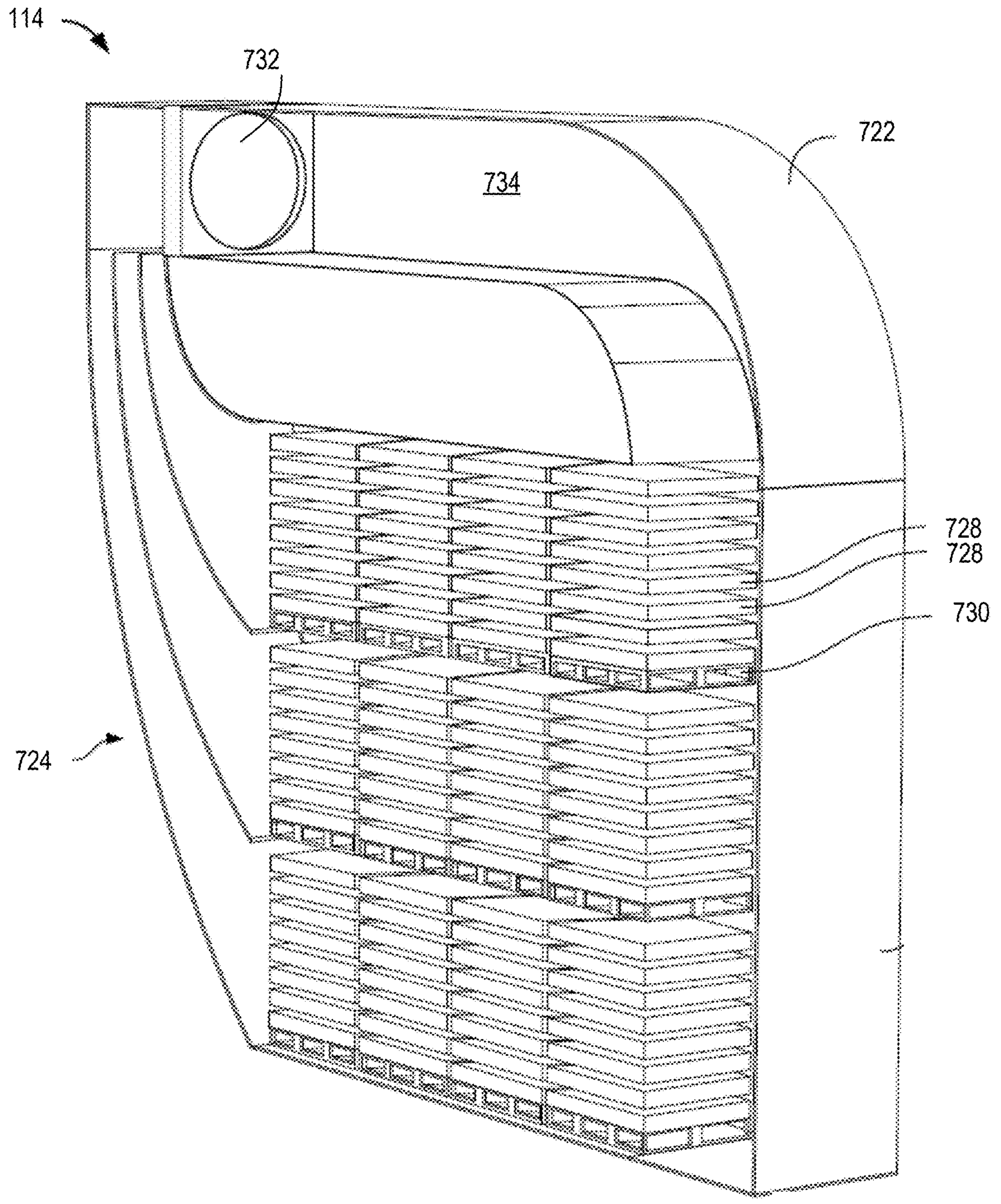
FIG. 7B illustrates an example blast cell.

In brief, the WMS 108 can be any type of warehouse management system that is used by the storage facility. Refer to FIGS. 7A-B for discussion about the storage facility. The WMS 108 can receive (e.g., from computing systems of customers, item suppliers, relevant users working in the storage facility, shippers, other storage facilities), manage, and/or maintain various types of information about items received and stored at the storage facility, customers of the storage facility, inbound shipments, outbound deliveries, components in the storage facility, and operations performed in the facility.

The RCS 110 can be any type of refrigeration control system that is used by the storage facility. The RCS 110 can be used to monitor and control conditions in the storage facility. For example, the RCS 110 can be used for selectively actuating or deactivating fans, refrigeration units, other types of cooling equipment or units throughout the facility and with respect to each of the blast cells in the facility. The RCS 110 can also include sensors (e.g., temperature, humidity) that can be positioned throughout the facility and used to collect and monitor ambient conditions in the facility. Based on the sensor data, the RCS 110 can be controlled to update, modify, or otherwise change the ambient conditions in the facility.

The user device(s) 104 can be any type of computing device (e.g., mobile phone, smartphone, laptop, tablet, computer) that may be used by relevant users of the storage facility. The relevant users can include blast cell operators or other workers in the storage facility. The user device(s) 104 can be configured to present/output in a graphical user interface (GUI) display user-interactable dashboards or portals described herein.

Still referring to the system 100 in FIG. 1A, the computer system 102 can receive data from the WMS 108 and/or the RCS 110 (block A, 160). The data can include but is not limited to pallet data, item data, energy usage data, energy-cost data, RCS data, WMS data, labor-cost data, temperature data, etc. The WMS data can include item types, item blast freezing durations, pull scheduling of items, and other types of data that may be provided, managed, and/or determined by the WMS 108. In some implementations, the data received in block A (160) can include data indicating classifications and/or categorization of one or more types of items that are part of a pallet.

The computer system 102 can generate at least one model to predict pallet blast freezing data (block B, 162). The model(s) can be a physics model, which can be trained to generate blast freezing curves for various different types of items (e.g., products) based on item data, blast cell freezing data, and/or other types of RCS data. For example, the physics model can be used to determine freezing curves of items coupled with their surrounding cold blast cell air. The physics model can be analytically solvable, lightweight, and efficient to run on any type of computing device and/or system with any available compute resources. This is beneficial for parameter fitting and/or when the model is used to predict and track the items freezing in real-time in the blast cell. The model(s) can also be trained to predict and/or track real-time and/or near real-time blast freezing of one or more items. The model(s) can be trained to predict and/or track energy-cost usage and/or labor-cost for blast freezing one or more items.

In block C (164), the computer system 102 can apply the model(s) to the received data to predict real-time freezing of at least one inbound pallet(s). One or more of the received data can be provided as input to the model(s). For example, data from shippers, producers, and/or customers about the particular inbound pallet can be provided as the input. Energy data and/or blast cell data can also be provided as input. The model(s) can process the input(s) to determine real-time freezing information for the at least one inbound pallet. The model(s) can generate one or more graphs, histograms, or other visuals that may depict the predicted real-time freezing of the at least one inbound pallet. In some implementations, the model(s) can generate output indicating the predicted real-time freezing of the at least one inbound pallet and the computer system 102 can use that output to generate one or more visuals depicting the predicted real-time freezing of the at least one inbound pallet.

In block D (166), the computer system 102 can determine a blast cell energy cost per pallet. The blast cell energy cost per pallet can be determined using a blast profit margin that is calculated by the computer system 102 and based on the received data. The blast profit margin can take into account both energy and labor costs. Thus, the energy cost of blast cell freezing operations can be calculated by leveraging a variety of data, including but not limited to WMS data, energy demand data (e.g., from third party providers such as energy companies), labor cost data, and/or RCS data. Refer to FIG. 6 for further discussion about determining the blast profit margin. The blast cell energy cost per pallet can be determined using one or more rules, algorithms, and/or calculations described herein. Refer to process 300 in FIG. 3A for further discussion about determining the blast cell energy cost per pallet. Although the computer system 102 is described as determining the blast cell energy cost per pallet, the computer system 102 can also determine one or more other blast cell costs per pallet using the same or similar techniques. The other blast cell costs can include but are not limited to overall costs to the facility, labor costs, operational costs, equipment maintenance costs, etc.

The computer system 102 can generate instructions to improve a blast freezing process at the facility (block E, 168). The instructions can be generated based on the determination in block D (166). The instructions can include recommendations for energy price adjustments or other energy or labor adjustments in the facility. The instructions can include recommendations about one or more periods of time in which energy-costs are expected to be lower (e.g., less than a threshold energy-cost level) and thus blast freezing operations should be performed. The instructions can include recommendations about when to stop, pause, start, and/or adjust operation of one or more particular blast cells in the facility. The instructions can include any other variety of recommended actions that can be taken to improve the blast freezing process at the facility.

The computer system 102 can transmit information including results from one or more of blocks C-E to the user device 104 (block F, 170). The user device 104 can output the information in a dashboard or portal in block G (172). Any one or more of the transmitted information can be presented in the dashboard(s) described further in reference to FIGS. 4A, 4B, 9A, 9B, and 9C. As illustrative examples, the dashboard can provide tracking of items and/or pallets of items that enter and/or exit blast cells, where the items are loaded in the blast cells, how long the items remain in the blast cells. The dashboard can provide visualizations indicating how long each blast cell remains full before and/or after a freezing cycle, which can beneficially be used to determine recommendations for reducing blast cell idle time and/or increasing throughput. The dashboard can provide automation and case of ability to monitor and control operation of each blast cell, regardless of a location of the user device 104 relative the blast cell. The dashboard can provide real-time and/or near real-time information that can be used to determine whether each blast cell is functioning properly before, during, and/or after the freezing cycle. The dashboard can provide real-time or near real-time tracking of blast freezing operations profitability (which can be based on the blast cell energy cost per pallet that is determined in block D, 166). The dashboard can also provide real-time blast cell monitoring and predictions based on the determinations made in the blocks C-E. Various other information can be provided in the dashboard as described in reference to FIGS. 4A, 4B, 9A, 9B, and 9C.

As yet another example, the computer system 102 can generate alerts, text messages, emails, and/or other notifications that can be transmitted to and presented at the user device 104. Said alerts can be generated by the computer system 102 based on monitoring the blast freezing process from data received from the WMS 108 and/or the RCS 110. As a merely illustrative example, the computer system 102 can receive sensor data from the RCS 110 and/or sensors positioned in a blast cell indicating temperature inside the blast cell. The computer system 102 can apply one or more temperature rules/thresholds to the sensor data to determine whether the temperature inside the blast cell is trending in balance with expected conditions for the respective blast freezing process. If the temperature inside the blast cell is not within the expected conditions for the respective blast freezing process, then the computer system 102 can generate and transmit an alert for presentation at the user device 104 in block F (170). The alert can include a recommendation to adjust the temperature inside the blast cell, to remove one or more particular types of items from the blast cell, to increase/decrease a fan speed within the blast cell, etc. Sometimes, one or more recommendations can be automatically implemented by the computer system 102, such as by transmitting instructions to be executed by the RCS 110 to automatically and immediately adjust the temperature of the particular blast cell. As other illustrative examples, the computer system 102 can receive and monitor data such as sensor data to determine whether, when, and if there are mechanical issues with one or more of the blast cells to be addressed. The computer system 102 can generate alerts to address the mechanical issues. The computer system 102 can generate and return alerts when other tasks need to be performed, including but not limited to adding or removing pallets from blast cells, moving pallets to storage locations or other areas within the facility, turning off power to a blast cell if a corresponding freezing process is complete and the pallets are already removed but the power is still on, etc. One or more other alerts may also be generated and returned, as described herein and in reference to FIGS. 9A, 9B, and/or 9C.

The user device 104 can also receive user input to modify the blast freezing process at the facility (block H, 174). For example, the relevant user can review some of the information presented in the dashboard and determine that a particular blast cell's freezing process should be paused and resumed at a particular time in the future. The user can provide input to the user device 104 indicating an adjusted schedule, which can then be transmitted to the computer system 102 (and/or directly to the RCS 110). Accordingly, the user device 104 can transmit the user input to the computer system 102 in block I (176). In some implementations, the user input can be transmitted directly to the RCS 110.

In block J (178), the computer system 102 can generate and/or transmit instructions to adjust the blast freezing process to the RCS 110. The instructions can be generated based on the user input. The instructions can additionally or alternatively be generated based on one or more of the determinations made in blocks C-E. For example, the computer system 102 can automatically determine that blast freezing processes in at least one blast cell should be stopped or paused until another time when energy demand and/or cost is predicted to be below a threshold level. The computer system 102 can then automatically transmit instructions to the RCS 100 to stop the processes in the at least one blast cell based on this determination. In some implementations, the computer system 102 can transmit recommended adjustments to the user device 104, which can present the recommended adjustments in the dashboard. The relevant user can then provide user input indicating a desire to implement at least one of the recommended adjustments or ignore the recommended adjustments. Based on the user input, the computer system 102 can perform block J (178).

Example adjustments include but are not limited to stopping a blast freezing process at one or more particular blast cells, starting a blast freezing process at one or more particular blast cells, pausing a blast freezing process at one or more particular blast cells, adjusting fans (e.g., speed, airflow direction, etc.) in one or more blast freezing processes, adjusting temperatures in one or more blast cells and/or locations in the storage facility, etc. Other illustrative examples of the adjustments can include instructions to control components, such as forklifts, autonomous guided vehicles (AGVs), cranes, and/or automated pallet movers, to route pallets in and out of the one or more particular blast cells. The computer system 102 can execute one or more rules and/or algorithms that are configured to determine optimal and/or most efficient paths and operations for moving the pallets throughout the facility, and more specifically to and from the blast cells and to and from storage locations throughout the facility. In some implementations, block J (178) can be performed before, during, or after one or more other blocks described herein.

In some implementations, the computer system 102 can generate and return controls that can be performed by autonomous and/or automated machines in the facility. Sometimes, the controls can be performed by humans or semi-automatically. For example, the computer system 102 can generate instructions that cause autonomous machines (e.g., forklifts, AGVs, cranes, robots, pallet movers) to remove pallets (or items) from blast cells, put pallets in the blast cells, and/or move pallets to and from different locations in the facility. The computer system 102 can generate instructions to turn blast cells on and off. As another example, the computer system 102 can receive and/or generate information about different categories and/or classifications of items, then use that information to generate and transmit signals or instructions that can cause the autonomous machines in the facility to move those items in the facility to their respective storage locations and/or to/from blast cells. The computer system 102 can determine to group together items or pallets having similar or same categories and/or classifications. The groupings can sometimes be determined based on characteristics and/or conditions at the facility. In some implementations, the computer system 102 can determine groupings for pallets that are within a threshold deviation of freeze time of each other. The threshold deviation can be 24 hours, 2 days, 3 days, 4 days, 5 days, etc. Larger blast cells can take groupings of pallets having greater deviations of freeze time, such as 3 day deviations and/or 5 day deviations. Smaller blast cells may take pallets having smaller deviations of freeze time, such as 1 day deviations. The grouped items or pallets can then be assigned to a same blast cell and/or level or rack in the same blast cell since they may have similar freeze times and/or properties.

As another example, knowing the categories and/or classifications of the items or pallets that are already in blast cells, the computer system 102 can determine whether items or pallets having different freeze times or properties were put in the same blast cell. If that is the case, then the computer system 102 can generate and return instructions that can cause the autonomous machines (or human workers operating equipment such as forklifts) to move one or more of the items or pallets with different freeze properties to another blast cell having items or pallets with similar freeze properties.

The computer system 102 can iteratively train the model (s) in block K (180). The model(s) can be trained based on any one or more of the determinations made in blocks C-E, H, and/or J. By iteratively training the model(s), model accuracy can be improved. Block K (180) can be performed before, during, or after any one or more of the blocks described herein.

In block L (182), the computer system 102 can determine an updated blast cell energy cost per pallet. This determination can be made based on any one or more determinations in blocks C-E, H, and/or J. The determination in block L (182) can be similar to the determination described in block D (166). The updated blast cell energy cost per pallet can be transmitted to the user device 104 and presented in the dashboard at the user device 104. In some implementations, the blast cell energy cost per pallet can be continuously computed and/or computed at predetermined intervals (e.g., when new data is received, when a change in current conditions is detected/recorded, every 5 minutes, every 10 minutes, every hour, every 12 hours, every 24 hours, etc.). As a result, the blast cell energy cost per pallet can be updated in real-time or near real-time and provided to the relevant user at their user device 104 to be used in monitoring and/or adjusting blast freezing operations at the facility.

The RCS 110 can adjust blast cell components and/or generate instructions to adjust the components in block Z (184). The adjustments can be made based on the instructions that are generated and/or transmitted by the computer system 102 in block J (178). The adjustments can be made based on the user input provided in block H (174), which can be directly transmitted to the RCS 110. In some implementations, the adjustments can be made automatically by the RCS 110. The adjustments can be made at various times, such as predetermined time intervals and/or continuously at the facility in order to maintain threshold ambient conditions in the facility (e.g., according to schedules that are determined for the facility), as described herein.

In some implementations, the RCS 110 or other components in the system 100 can transmit or provide acknowledgements of actions performed back to the computer system 102. Sometimes, the acknowledgements can be provided as inputs at human worker devices. The acknowledgements can be provided as automated signals from sensor devices attached to the autonomous machines described herein and/or sensor devices positioned throughout the facility. The acknowledgements can indicate, as merely illustrative examples, that a pallet was successfully moved to a designated location (e.g., rack in a blast cell), safety checks were performed on a blast cell before operation, doors were closed in one or more blast cells, etc. The acknowledgements can be used by the computer system 102 to adjust or modify decisions that are generated by the computer system 102. For example, the computer system 102 can process the acknowledgements to determine when to start a blast cell, when to pause the blast cell, and/or how long to run the blast cell for (e.g., the computer system 102 can adjust a timer for operating the blast cell, as shown in at least FIGS. 9A, 9B, and 9C).

Figure 1B:
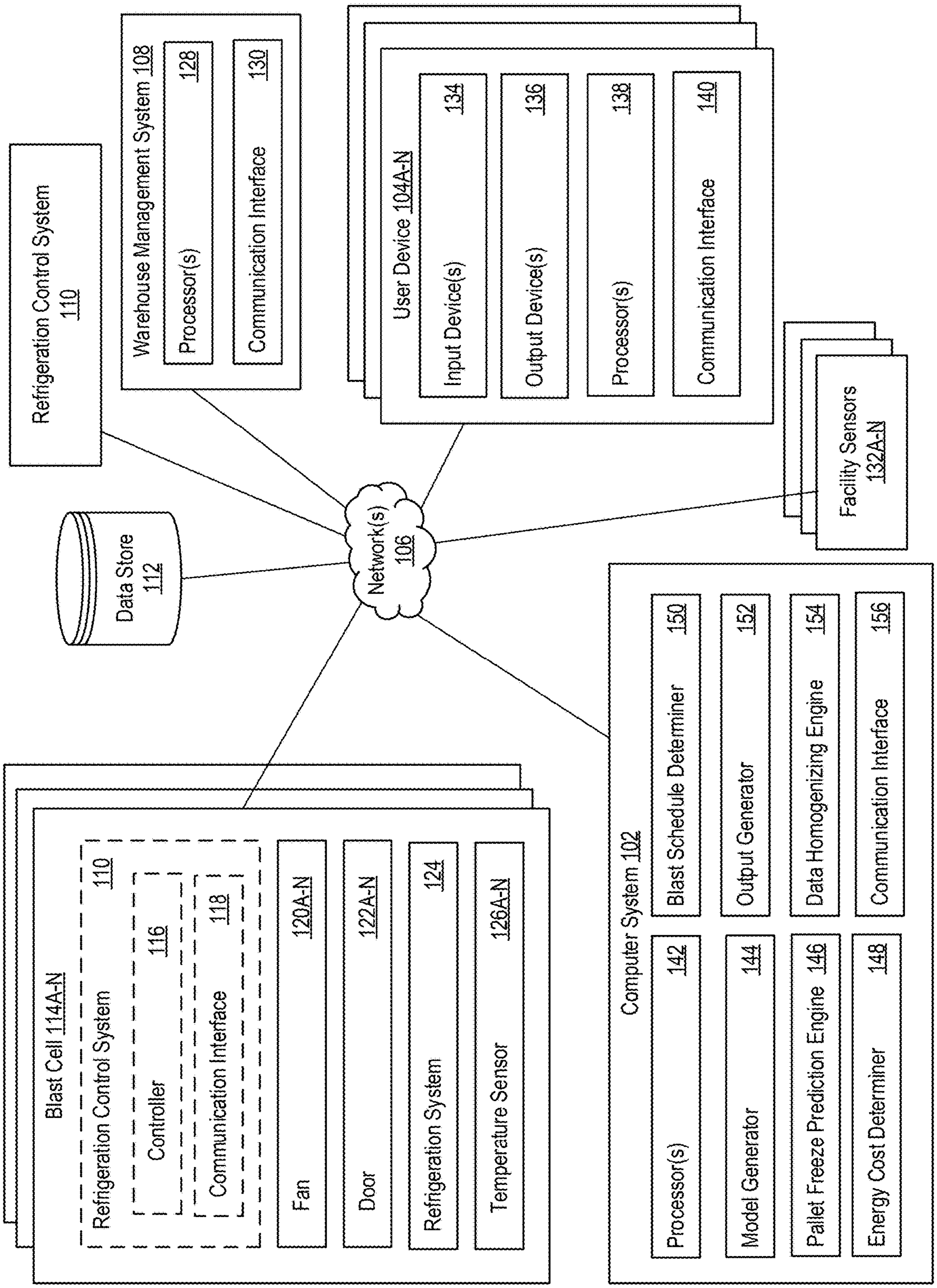
FIG. 1B is a system diagram of components that can be used to perform the disclosed techniques.

FIG. 1B is a system diagram of components that can be used to perform the disclosed techniques. The computer system 102, user devices 104A-N, WMS 108, and RCS 110 can communicate via the network(s) 106 with each other and with one or more other components, including but not limited to blast cells 114A-N, a data store 112, and/or facility sensors 132A-N.

The computer system 102 can include processor(s) 142, a model generator 144, a pallet free prediction engine 146, an energy cost determiner 148, a blast schedule determiner 150, an output generator 152, a data homogenizing engine 154, and a communication interface 156. The components of the computer system 102 are merely illustrative. The computer system 102 can include additional, fewer, or other components.

The processor(s) 142 can be configured to perform one or more of the operations described herein. The communication interface 156 can be configured to provide communication between the computer system 102 and one or more other components described in FIG. 1B.

The model generator 144 can be configured to generate, train, and/or update one or more models described herein. The generator 144 can receive training input data from one or more of the components described herein. Using the training input data, the generator 144 can generate models for predicting energy usage, blast cell operations, and other processes described herein. The generated model(s) can be stored in the data store 112 and used by one or more components of at least the computer system 102.

The pallet freeze prediction engine 146 can be configured to predict pallet freezing conditions of one or more inbound pallets. For example, the engine 146 can determine how long it may take to freeze a particular inbound pallet under current and/or projected operating conditions at the facility. The engine 146 can determine how much energy may be required and/or how much energy may be consumed in order to freeze the particular inbound pallet. The engine 146 can apply the model(s) generated by the model generator 144 to data received about the inbound pallets, blast cells in the facility, energy demand and other energy information, and/or overall operations of the facility. The data can be received from a third-party computing system, such as a shipper, customer, or energy provider, the WMS 108, and/or the data store 112.

The energy cost determiner 148 can be configured to calculate energy costs per pallet as described throughout this disclosure. Refer to the process 300 in FIG. 3A for further discussion.

The blast schedule determiner 150 can be configured to generate suggested/recommended blast schedules that can be implemented at the facility to improve operations and efficiency at the facility. As described herein, the determiner 150 can identify times at which energy demand and/or costs may be lowest (e.g., below a threshold level) and generate recommendations for performing one or more blast freezing processes during such times. In some implementations, the determiner 150 can automatically transmit blast schedules to the RCS 110 to control or adjust current or future operations of one or more of the blast cells 114A-N. The determiner 150 can generate the schedules based on a variety of data from the other components described herein, including determinations made by the pallet freeze prediction engine 146 and/or the energy cost determiner 148.

The output generator 152 can be configured to generate one or more of the dashboards described herein. Refer to FIGS. 4A, 4B, 9A, 9B, and 9C for further discussion about the dashboard(s). The generator 152 can provide the dashboard(s) and/or updated dashboard(s) to the user devices 104A-N for presentation in their respective GUI displays.

The data homogenizing engine 154 can be configured to aggregate, format, and/or homogenize a variety of data from a variety of data sources. Refer to process 350 in FIG. 3B for further discussion. Once the data is homogenized by the engine 154, the data can be stored in the data store 112 and/or provided to one or more of the components of the computer system 102 for additional and further processing described above.

The user devices 104A-N can each include input device(s) 134, output device(s) 136, processor(s) 138, and a communication interface 140. The processor(s) 138 can be configured to perform one or more of the operations described herein. The communication interface 140 can be configured to provide communication between the user device 104 and one or more other components described in FIG. 1B. The input device(s) 134 can include any type of input device including but not limited to screens, touch screens, GUI displays, microphones, keyboards, and/or mice. The input device(s) 134 can be configured to receive user input described herein, which can be provided by relevant uses in response to viewing the dashboard(s) at the user device 104. The output device(s) 136 can include any type of output device including but not limited to screens, touch screens, GUI displays, and/or speakers. The output device(s) 136 can be configured, for example, to present the dashboard(s) that is generated by the output generator 152 of the computer system 102.

The WMS 108 can include processor(s) 128 and a communication interface 130. The processor(s) 128 can be configured to perform one or more of the operations described herein. The communication interface 130 can be configured to provide communication between the WMS 108 and one or more other components described in FIG. 1B. The components of the WMS 108 are merely illustrative. The WMS 108 can include additional, fewer, or other components.

The RCS 110 can include a variety of components that can be used for controlling ambient conditions in the facility and/or blast freezing operations/processes of each of the blast cells 114A-N.

The data store 112 can be any type of data repository, database, memory, RAM, and/or cloud based system for storing a variety of data described throughout this disclosure.

The facility sensors 132A-N can include any variety of sensors positioned throughout the facility, including but not limited to temperature sensors, humidity sensors, pressure sensors, motion sensors, and/or image sensors. Data can be continuously collected by the sensors 132A-N and provided to the computer system 102 as additional inputs for one or more of the operations performed by the components 144, 146, 148, 150, 152, and/or 154. In some implementations, data collected by the sensors 132A-N can also be provided to the RCS 110 and used by the RCS 110 to determine adjustments to one or more ambient conditions in the facility or one or more of the blast cells 114A-N. For example, temperature data collected by one or more sensors 132A-N can be used to determine whether a particular cold storage location in the facility is maintained at a threshold temperature value or range. If the temperature in that location does not satisfy the threshold temperature value or range, then the RCS 110 can determine or execute one or more adjustments, such as controlling one or more fans in that location to suck warm air out of that location or to push cooled air into that location.

Each of the blast cells 114A-N can include fans 120A-N, doors 122A-N, a refrigeration system 124, and temperature sensors 126A-N. Optionally, the blast cells 114A-N can each include the RCS 110. For example, the RCS 110 in the blast cell 114 can include a controller 116 and a communication interface 118. The controller 116 can be configured to execute one or more instructions to adjust blast freezing processes at the respective blast cell 114. The communication interface 118 can provide communication between the RCS 110 of the blast cell 114 and other components described in FIG. 1B. In some implementations, for example, the controller 116 of the RCS 110 for the particular blast cell 114 can receive the blast schedule determined by the blast schedule determiner 150 of the computer system 102 or user input provided at the user device 104 for adjusting a current blast freezing process at the blast cell 114. The controller 116 can then execute such blast schedule or instructions associated with the user input. The components of the blast cells 114A-N are merely illustrative. The blast cells 114A-N can include additional, fewer, or other components. Refer to FIGS. 7A-B for further discussion about the blast cells 114A-N.

The fans 120A-N can be configured to direct airflow in and around pallets of items that are placed inside the blast cell 114 in order to cool the items. The fans 120A-N can be independently controlled by the controller 116 of the RCS 110, for example.

The doors 122A-N can be configured to open and close to permit the placement and removal of the pallets of items from the blast cell 114. The doors 122A-N can be automatically operated/controlled by the controller 110. The doors 122A-N can be manually operated by one or more workers in the facility and/or facility vehicles, including but not limited to forklifts, robots, or other automated vehicles used in the storage facility.

The refrigeration system 124 can include one or more components for causing cooled air to be circulated inside the blast cell 144 and in/around the pallets of items placed therein in order to cool the items. The refrigeration system 124 can be controlled by the controller 116 of the RCS 110.

The temperature sensors 126A-N can be positioned throughout the blast cell 114 and configured to capture data indicating temperature values inside and/or around the blast cell 114. The temperature data can be provided to the controller 116, the RCS 110, and/or the computer system 102, and used to make any one or more of the determinations described above (e.g., adjusting current conditions inside the blast cell 114, determining projected energy costs per pallet, predicting pallet freeze conditions, etc.).

Figure 1C:
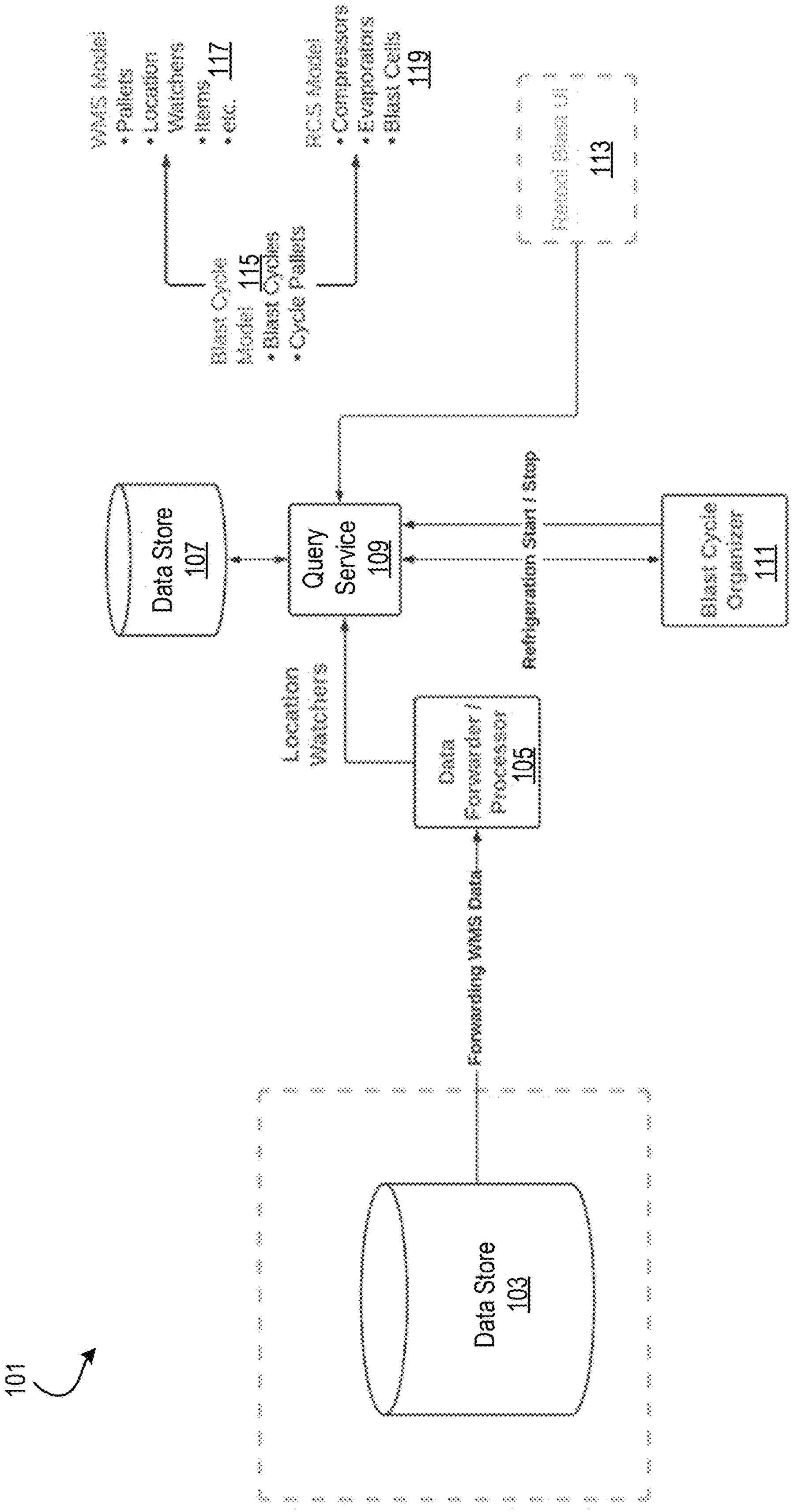
FIG. 1C is a conceptual diagram of data communication between components that can perform the disclosed techniques.

FIG. 1C is a conceptual diagram of data communication between components in a system 101 that can perform the disclosed techniques. Various components can communicate with each other to generate controls for starting and/or stopping refrigeration systems or other components in a facility.

A data store 103 can maintain WMS data for the facility. This data can be forwarded by a data forwarder and/or processor 105 to one or more other components in the system 101. For example a query service 109 can receive the forwarded WMS data. Using this data, the query service 109 can query another data store 107 for energy data and/or refrigeration data associated with the facility. The energy data can include, for example, usage, purchase, offloading, etc. The refrigeration data can include, for example, controls, energy usage, schedules, etc. The query service 109 can use a graph-based querying language. Using any of the data that the query service 109 is forwarded and/or queries, controls can be generated and transmitted to a blast cycle organizer 111 to start and/or stop refrigeration systems in the facility or otherwise generate or recommend controls for organizing, controlling, and optimizing the blast cells. Inputs can also be received at the query service 109 by a UI 113. For example, the UI can include any of the front end GUIs described throughout this disclosure. In the GUIs, a relevant user can provide input for controlling one or more of the blast cells (or adjusting operations of the blast cells). Such inputs can be provided by the UI 113 to the query service 109 and used by the query service 109 to determine appropriate blast cell controls.

In some implementations, one or more models 115, 117, and/or 119 may also be used in the system 101 to determine and/or recommend appropriate blast cell controls. For example, the model 115 can be trained and used to determine blast cell controls, including but not limited to blast cycles and/or cycle pallets. The model 115 can be trained using data from the data store 103. Output from the model 115 can be provided to the models 117 and/or 119 for further processing. For example, the model 117 can be configured to determine WMS information associated with the facility. The model 117 can be trained to determine and/or continuously update pallets, locations, and/or other related WMS information. The model 119 can be trained to generate recommendations and/or controls for the RCS. For example, the model 119 can be trained to determine controls for compressors, evaporators and/or blast cells. Sometimes, output from any one or more of the models 115, 117, and/or 119 can be fed back into other models to iteratively improve determinations and/or improved blast cell controls/operations. In some implementations, the models 115, 117, and/or 119 can be performed in any other order, in parallel, and/or in series.

Figure 2A:
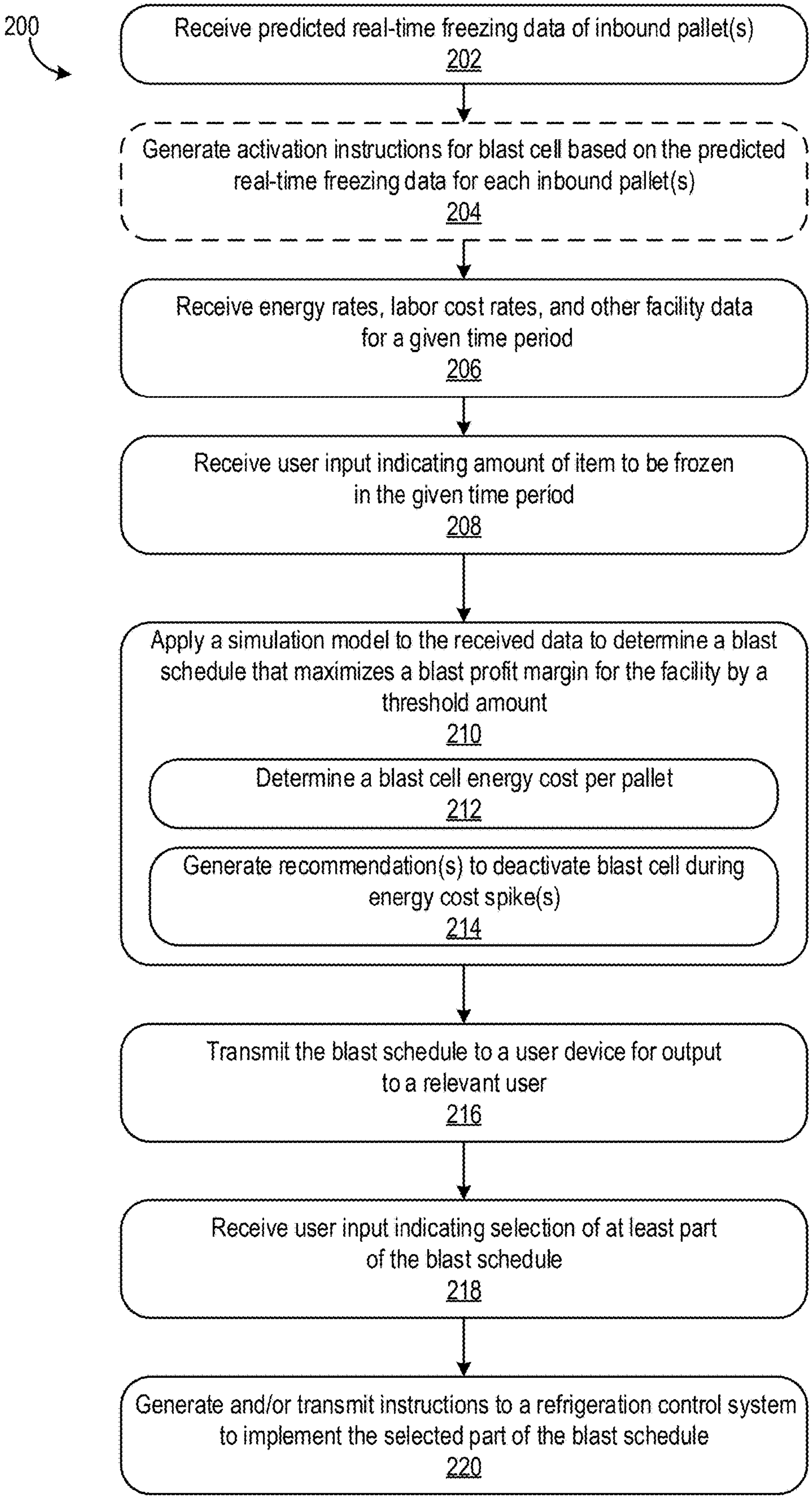
FIG. 2A is a flowchart of a process for determining a blast cell schedule to optimize blast cell profit margin.

FIG. 2A is a flowchart of a process 200 for determining a blast cell schedule to optimize blast cell profit margin. The process 200 can be performed by the computer system 102. The process 200 can also be performed by one or more other computing systems, devices, computers, networks, cloud-based systems, and/or cloud-based services. For illustrative purposes, the process 200 is described from the perspective of a computer system.

Referring to the process 200 in FIG. 2A, the computer system can receive predicted real-time freezing data of at least one inbound pallet of items (block 202). In some implementations, as part of block 202, the computer system can determine the predicted real-time freezing data, such as determining how long it may take to freeze the inbound pallet(s) of items and/or how much energy may be required to freeze the inbound pallet(s) of items. In some implementations, the computer system can determine the predicted real-time freezing data at another time, store the determined prediction in a data store, and retrieve the determined prediction in block 202. Refer to block C (164) in FIG. 1A for further discussion.

Optionally, the computer system may generate activation instructions for at least one blast cell based on the predicted real-time freezing data for the inbound pallet(s) block 204. As an illustrative example, if the predicted real-time freezing data indicates that the inbound pallet(s) may require a period of time that exceeds a threshold amount of time for freezing the items on the inbound pallet(s) or that the inbound pallet(s) must be delivered to a customer within a predetermined period of time, then the computer system can generate instructions that cause the inbound pallet(s) to be moved into an available blast cell (e.g., a blast cell having space for a size of the inbound pallet(s), a blast cell containing other pallets of items with similar required freezing conditions as the inbound pallet(s), a blast cell that is about to be activated to begin a blast freezing process) and/or for a blast freezing process to begin at a blast cell that contains at least the inbound pallet(s). The instructions can be transmitted to components in the facility having the blast cell. For example, the instructions can be transmitted to an automated vehicle (e.g., robot, forklift) that causes the vehicle to automatically pick up and/or move the inbound pallet(s) into the designated blast cell. The instructions can be transmitted to a device of a worker inside the facility that instruct the worker to pick up and/or move the inbound pallet(s) into the designated blast cell. The instructions can be transmitted to an RCS in the facility that causes the RCS to control components such as a refrigeration unit and/or fans to begin the blast freezing process in the designated blast cell. In some implementations, the instructions can be transmitted to a device of a worker that instructs the worker to manually begin the blast freezing process in the designated blast cell.

In block 206, the computer system can receive energy rates, labor cost rates, and/or other facility data for a given time period. Such information can be received from a variety of systems, including but not limited to a WMS and/or third-party computing systems (e.g., an energy provider system). In some implementations, the computer system can retrieve any of this information from the data store described herein. The given time period can be defined by a relevant user associated with the facility. For example, the user may desire to determine energy costs per pallet over the next 5 days at the facility. The given time period can then be 5 days, which can be provided as user input at a computing device of the user (e.g., using the dashboard(s) described herein, such as in FIGS. 4A, 4B, 9A, 9B, and 9C). In some implementations, the given time period can be predetermined, including but not limited to a next day, a next 3 days, a next 10 days, a next week, a next 2 weeks, a next month, etc.

The computer system may receive user input indicating an amount of item(s) to be frozen in the given time period in block 208. The user input can be provided by the relevant user at their computing device. In some implementations, the computer system can determine the amount of item(s) to be freezing in the given time period based on retrieving and analyzing historical data for the facility. The historical data can indicate, for example, on average during similar or same time periods, how many items had been frozen. The amount of items to be frozen can be determined based on facility data, customer data, and/or item data. In some implementations, the computer system can determine the amount of item(s) to be frozen in the given time period for a particular customer. The amount of item(s) to be frozen in the given time period can also be determined for the facility as a whole. The amount of item(s) to be frozen in the given time period can additionally or alternatively be determined for a particular type of item (e.g., regardless of the customer).

Then, the computer system can apply a simulation model to the received data to determine a blast schedule that maximizes a blast profit margin for the facility by at least a threshold amount (block 210). The simulation model can be a machine learning-trained model. The model can be trained by the computer system as described herein, then stored in the data store and retrieved for runtime use in block 210. The model can receive the data as input to simulate various blast schedules that may be used to efficiently and quickly freeze the inbound pallet(s) within the given time period. The model can return all of the simulated blast schedules. The model can return a subset of the simulated blast schedules, such as a threshold quantity of simulated blast schedules that achieve a highest maximization of the blast profit margin or that maximize the blast profit margin by at least the threshold amount. The computer system can receive the simulated blast schedules as the model output and select an optimal blast schedule. The optimal blast schedule can maximize the blast profit margin by at least the threshold amount. Refer to FIG. 6 for further discussion about the blast profit margin.

In some implementations, the simulation model can be trained to determine and output the blast schedule based at least in part on (i) a product type and (ii) a packaging material type for each of the items loaded into the blast cell(s). Such information can impact how long the items may need to remain inside the blast cell(s) to ensure proper cooling/freezing (e.g., according to food safety regulations). Differences in the product type can cause cooling cycles to change and/or changes to be made to different phases of the cooling cycle. Accordingly, the model can be trained to correlate the type of product and/or the packaging material with different phase changes that can occur in the cooling cycle of the blast cell.

The model can generate output indicating adjustments that can be made to the blast cell's cycle once phase changes occur. For example, after a phase change occurs, model output can indicate that the blast cell's cycle can be paused. Before a phase change, however, model output can indicate that the cycle should not be paused, especially since the product may be somewhat warm and can perish or otherwise spoil if the cooling cycle is paused. The model can generate output indicating how long the cycle can be paused after the phase change without causing the products placed within the blast cell to spoil or perish. Duration of the pause can be determined based at least in part on a real-time temperature of the products and/or product type information. Pausing the cycle for a couple hours may not have sufficient impact on potential spoilage of the products inside the blast cell. For example, if the products are cooled in the blast cell for 24-72 hours, then pausing the blast cell cycle for approximately 2-3 hours may likely have no impact on temperature and spoilage of the products inside the blast cell. Sometimes, the model can generate output indicating recommendations to pause the cycle during a phase change, which can be heavily product dependent.

Figure 3A:
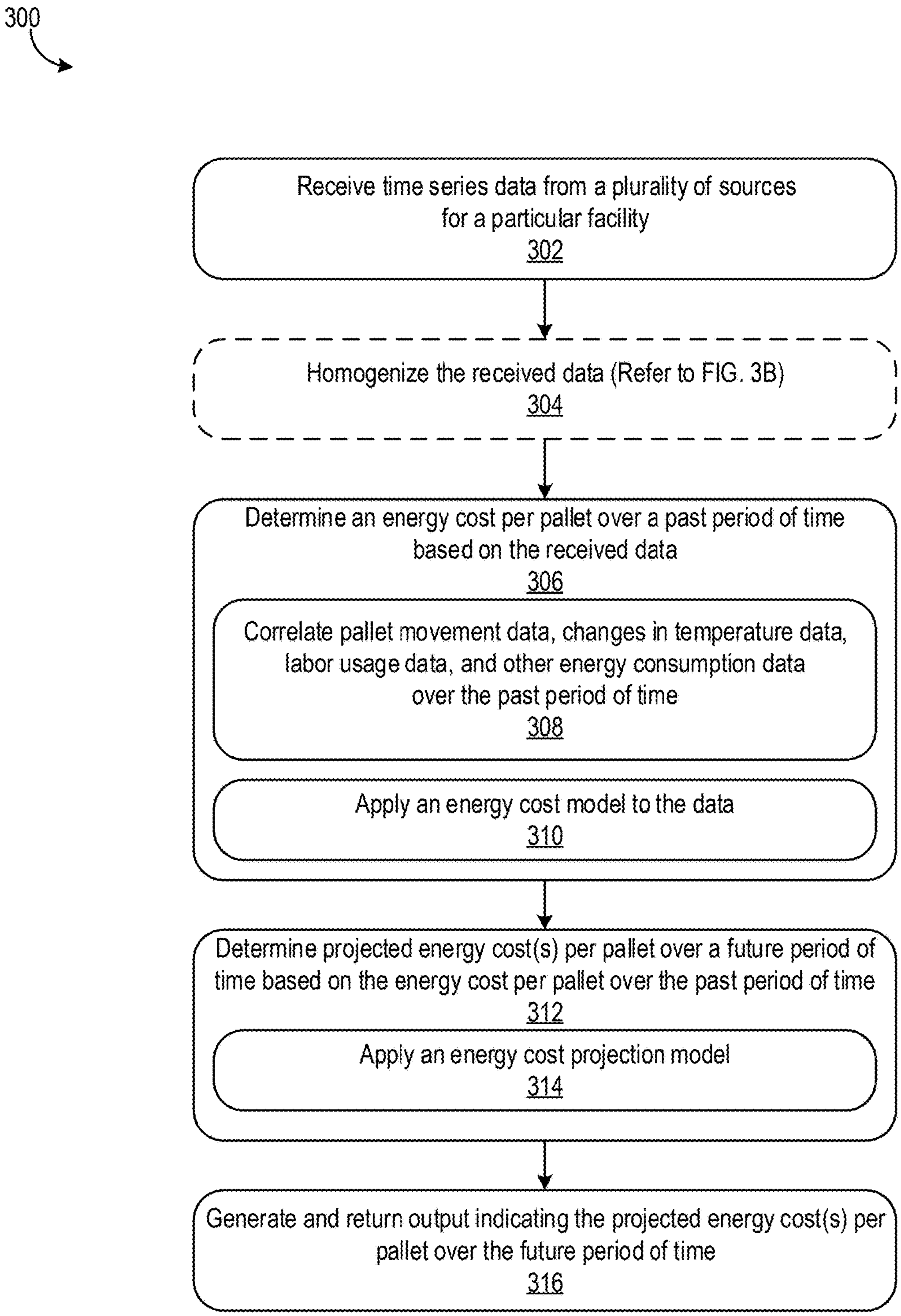
FIG. 3A is a flowchart of a process for determining a projected energy cost per pallet.

As part of determining the blast schedule, the computer system can determine a blast cell energy cost per pallet, as described further in the process 300 of FIG. 3A (block 212). The blast cell energy cost per pallet can be provided as an input to the simulation model.

The computer system can also generate at least one recommendation to deactivate the blast cell(s) during one or more energy cost spike(s) (block 214). For example, the determined blast schedule can indicate times at which blast freezing processes at one or more of the blast cells should be deactivated, stopped, or otherwise paused. The times can be indicative of energy cost spikes (e.g., when energy is in high demand, during peak hours during business days). The computer system can therefore generate the recommendation(s) indicating that during those times in the determined blast schedule, the one or more blast cells should be deactivated. The recommendation(s) can be provided to the relevant user at their computing device. The user can choose to accept or otherwise implement the recommendation(s) or reject the recommendation(s). In some implementations, the user may modify the recommendation(s) and then accept the modified recommendation(s) for implementation.

In block 216, the computer system can transmit the blast schedule to the user device for output to the relevant user. The blast schedule can be outputted at the user computing device, such as shown and described regarding the dashboard(s) described in reference to FIGS. 4A, 4B, 9A, 9B, and 9C. The blast schedule can be outputted as a graph and/or timetable. For example, the blast schedule can be outputted as a timetable indicating energy costs for different periods of time during the given time period at which the blast cell(s) can be activated to freeze the inbound pallet(s) of items. The user can view the timetable and determine which of the different periods of time appear desirable. For example, the user can determine that energy costs in the middle of the night in 3 days would result in the best energy and labor cost savings to the facility while still ensuring the inbound pallet(s) of items is timely delivered to the respective customer. As another example, the blast schedule can indicate various times during the given time period at which blast freezing processes should be started and/or paused.

The computer system may receive user input indicating selection of at least part of the blast schedule in block 218. In the above example, the user can select a grid in the timetable for performing the blast freezing process during the middle of the night in 3 days. As another example, the user can simply select an option presented at their computing device to accept or otherwise implement the blast schedule as a whole for the given time period.

Accordingly, the computer system can generate and/or transmit instructions to the RCS of the facility to implement the selected part of the blast schedule (block 220). Refer to block J (178) in FIG. 1A for further discussion.

Figure 2B:
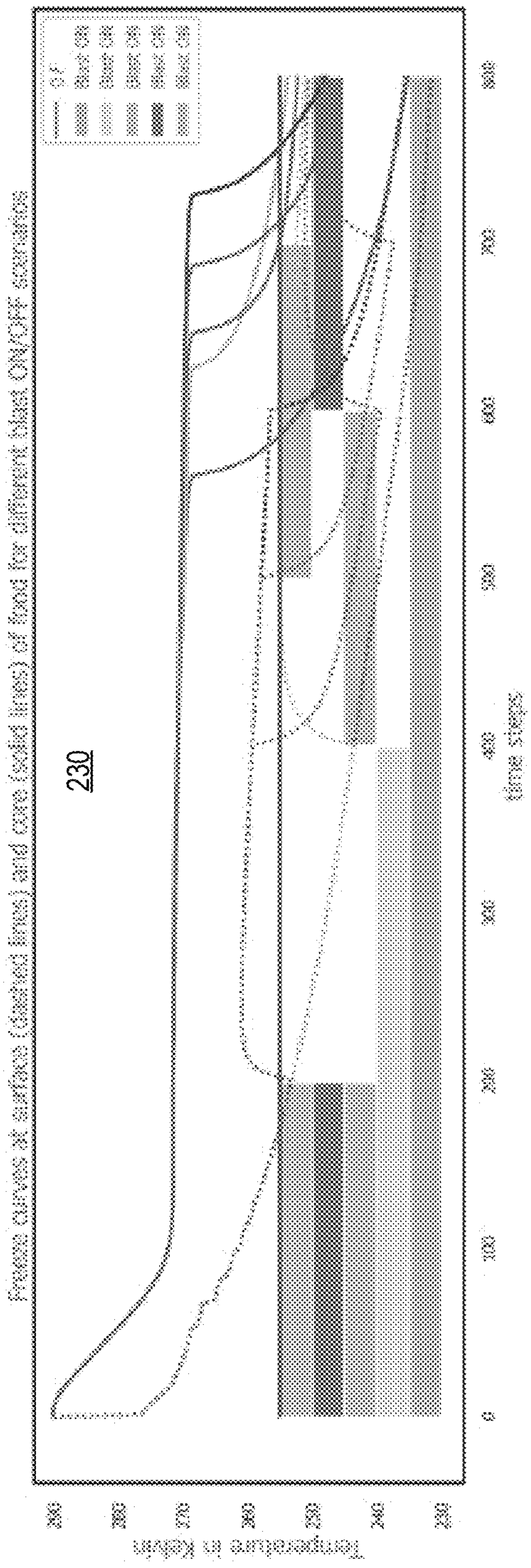
FIG. 2B illustrates a graph of blast scheduling simulation for optimizing blast cell profit margin.

FIG. 2B illustrates a graph 230 of blast scheduling simulation for optimizing blast cell profit margin. The graph 230 can be generated by the computer system as part of determining a blast schedule that maximizes a blast profit margin for the facility using the simulation model in block 210 of the process 200 in FIG. 2A.

As an illustrative example, pallet history data from a WMS can be combined with refrigeration data to simulate blast cell energy costs/usage. Based on the amount of time that pallets of items spend in a blast cell versus the amount of time that they are in the blast cell when the blast cell is running/activated, energy usage can be reduced by not over-blasting or over-freezing the pallets of items or by turning the blast cell off between blast cycles (e.g., between blast freezing processes or operations). Throughput may also be increased by ensuring that the blast cell is loaded, turned on, and unloaded efficiently, thereby reducing idle time as much as possible. Increasing throughput in this manner can directly benefit the facility as it would permit the facility to increase its item capacity without investing in new or additional blast cells. Moreover, the simulations described herein can be used to provide accurate tracking of each pallet in a blast cycle to prevent any costly food safety issues from arising, such as removing the pallet from the blast cell before a full allotted blast freeze time is achieved (which can run the risk of food spoilage and waste).

Blast freezing can be profitable for the facility because it accounts for a good percentage of the facility's revenue. Determining the blast profit margin can beneficially help measure success and efficiencies of the facility, such as increased profit and/or reduced carbon footprint. The blast profit margin can be a calculated metric/numerical value that represents profitability and efficiencies of blast cell freezing operations in a facility. The blast profit margin can also be utilized to reliably determine whether blast freezing is truly profitable for the particular facility where an increase of energy and/or labor costs may be rising. Ultimately, the blast profit margin can be used to price blast freeze processes in the facility and justify these prices based on market price changes and/or demand. Refer to FIG. 6 for further discussion about the blast profit margin.

Blast schedule optimization can be used to optimize the blast profit margin, which may depend on a variety of factors, including but not limited to an amount of items a customer has, blast cell capacity in a facility, and/or energy prices/demand. A blast time prediction algorithm as described throughout this disclosure can be used to track items as they freeze in real-time in the blast cell(s). Such tracking can provide for the blast freezing process to be pulsed (e.g., turning the blast cell on and off) as needed to avoid energy price spikes. For example, a lightweight simulation can be run on available data (e.g., processing being performed in milliseconds, seconds, or less than a minute) to track an item freezing in a blast cell, as shown by the graph 230. Objective functions and/or constraints can also be measured/determined to optimize blast scheduling given different energy rates throughout a period of time (e.g., a day). Thus, when a user provides information about how many items need to be frozen in a given period of time, as described in the process 200 of FIG. 2A, the computer system described herein can suggest a blast schedule that minimizes energy usage and maximizes throughput, such as maximizing the blast profit margin for the facility.

The blocks at the lower half of the graph 230 represent times at which the blast freezer is on and actively freezing the items placed therein. Depending on when the blast cell is pulsed on and off, the items inside the blast cell finish freezing at different times. By turning the blast cell off during energy cost spikes, for example, overall energy costs can be reduced.

FIG. 3A is a flowchart of a process 300 for determining a projected energy cost per pallet. The process 300 can be performed by the computer system 102. The process 300 can also be performed by one or more other computing systems, devices, computers, networks, cloud-based systems, and/or cloud-based services. For illustrative purposes, the process 300 is described from the perspective of a computer system.

Referring to the process 300 in FIG. 3A, the computer system can receive time series data from a plurality of sources for a particular facility (block 302). The data can be any type of data described herein, including but not limited to truck arrival and/or departure data, storage location data, order data, pallet data, energy usage data, localization data, refrigeration system asset data, facility temperature data, temperature set point(s) data, solenoid state(s) data, and/or blast cell state(s) data. Being time series data, the data can be indexed in a time order. The data can be timestamped. The data may also be a sequence of data taken at successive points in time (e.g., equally-spaced points in time and/or different time intervals). The timing aspect of the data can be used by the computer system to associate measured and/or projected energy costs with different points in time when activities occur in the facility, such as the storage facility described above. The timing aspect can also be used to determine times of day at which one or more modifications can be made to the facility to optimize the facility's energy usage (e.g., switching from morning blast cell processes to nighttime blast cell processes, which is when utility pricing for energy is lower).

Optionally the computer system can homogenize the received data in block 304. The computer system can translate the received data between time series to a standardized format and then attribute the standardized data to different infrastructures and/or actors in the facility. The computer system is able to process and analyze various different data from various different services and/or actors, where each data can be a different type and/or format. As a result, the computer system can generate more accurate and robust determinations, projections, and/or modifications by tapping into all different types of data that may be associated with the particular facility. Refer to the process 350 in FIG. 3B for further discussion.

The computer system can determine an energy cost per pallet over a past period of time based on the received data in block 306. For example, the computer system can correlate pallet movement data, changes in temperature data, labor usage data, and/or other energy consumption data over the past period of time in block 308 to determine how much energy it may take (e.g., cost, consume) over the period of time to move and/or freeze the particular pallet. As an illustrative example, the computer system can identify changes in temperature in a blast cell during a blast freezing process and an amount of time that a particular pallet is in the blast cell when the cell is idle. This data can be correlated and attributed to a change in temperature of the pallet once it exits the blast cell and/or an energy cost of operating the blast cell while the pallet is placed therein. As another illustrative example, the computer system can determine overall energy costs incurred at the facility when operating one or more blast cells. The computer system can then apportion the overall energy costs to each of the pallets that were moved or otherwise placed in those blast cells.

In some implementations, the determined energy cost(s) can be apportioned to each pallet using one or more weights, scaling factors, and/or criteria. For example, a larger pallet of items can be apportioned more of the determined energy cost(s) than a smaller pallet because the larger pallet of items may have more surface area to freeze or take space in a blast cell than the smaller pallet. As another example, an initially warmer pallet of items can be apportioned more of the determined energy cost(s) than a colder pallet of items because the warmer pallet can require more time in the blast cell to freeze to a desired temperature for the items therein. One or more other weights, scaling factors, and/or criteria may also be used to determine how much of the energy cost(s) to apportion to each pallet.

The computer system can apply an energy cost model to the data in block 310. The energy cost model can be a machine learning-trained model. The model can be trained to aggregate data from a variety of sources, determine a total energy consumed by the facility over the past period of time, and then apportion the total energy consumed to one or more particular pallets of items, as described above in reference to blocks 306 and 308.

In block 312, the computer system can determine projected energy cost(s) per pallet over a future period of time based on the energy cost per pallet over the past period of time. For example, the computer system can apply an energy cost projection model in block 314. The model can be a machine learning-trained model. The model can be trained to map the energy cost per pallet over the past period of time to future energy prices, future energy usages, future inbound and outbound shipments, and other future or projected logistics associated with the facility. The model can also be trained to project/predict how the energy cost per pallet over the past period of time may change over the future period of time. The projection/prediction can be made based on analysis and correlation of historic data (e.g., historic energy consumption, historic energy prices, historic weather data, historic shipment volume data) associated with the facility and/or the pallets (including pallets that were apportioned the energy cost over the past period of time and other pallets, such as pallets from suppliers who are expected to ship more pallets to the facility over the future period of time).

Sometimes, the computer system can determine projected energy costs over the future period of time for pallets that are selected or otherwise identified by a relevant user of the facility. For example, in a GUI dashboard at a user computing device of the user, the user can provide user input indicating selection of a particular order of pallets that is expected to arrive at the facility the next day. The computer system can receive this input, determine the energy cost per pallet in the order over one or more previous periods of time and then project the energy cost per pallet in the order at a time that the order is expected to arrive the next day. The computer system can also project the energy cost per pallet in the order for one or more other future times before or after the time that the order is expected to arrive the next day. As a result, the computer system can determine various different energy costs that the user can choose from to efficiently use energy without negatively impacting overall efficiency and operations inside the facility. The computer system can also generate, based on the various different energy costs, one or more suggested modifications to blast schedules in the facility to reduce energy consumption and/or energy/labor costs.

The computer system can then generate and return output indicating the projected energy cost(s) per pallet over the future period of time (block 316). The output can include numeric values indicating the projected energy cost(s) per pallet over the future period of time. This output can then be used by the computer system to determine an optimized blast schedule and/or adjustments that can be made to existing blast schedules to reduce energy consumption, energy costs, and/or labor costs. In some implementations, the output can include a table or other schedule indicating the projected energy cost per pallet at one or more future times. The output can include one or more graphs (e.g., bar graphs, line graphs, pie charts) indicating the projected energy cost(s) per pallet at one or more future times and/or over the future period of time. The output can be presented in a dashboard at the relevant user's computing device, as described herein.

Figure 3B:
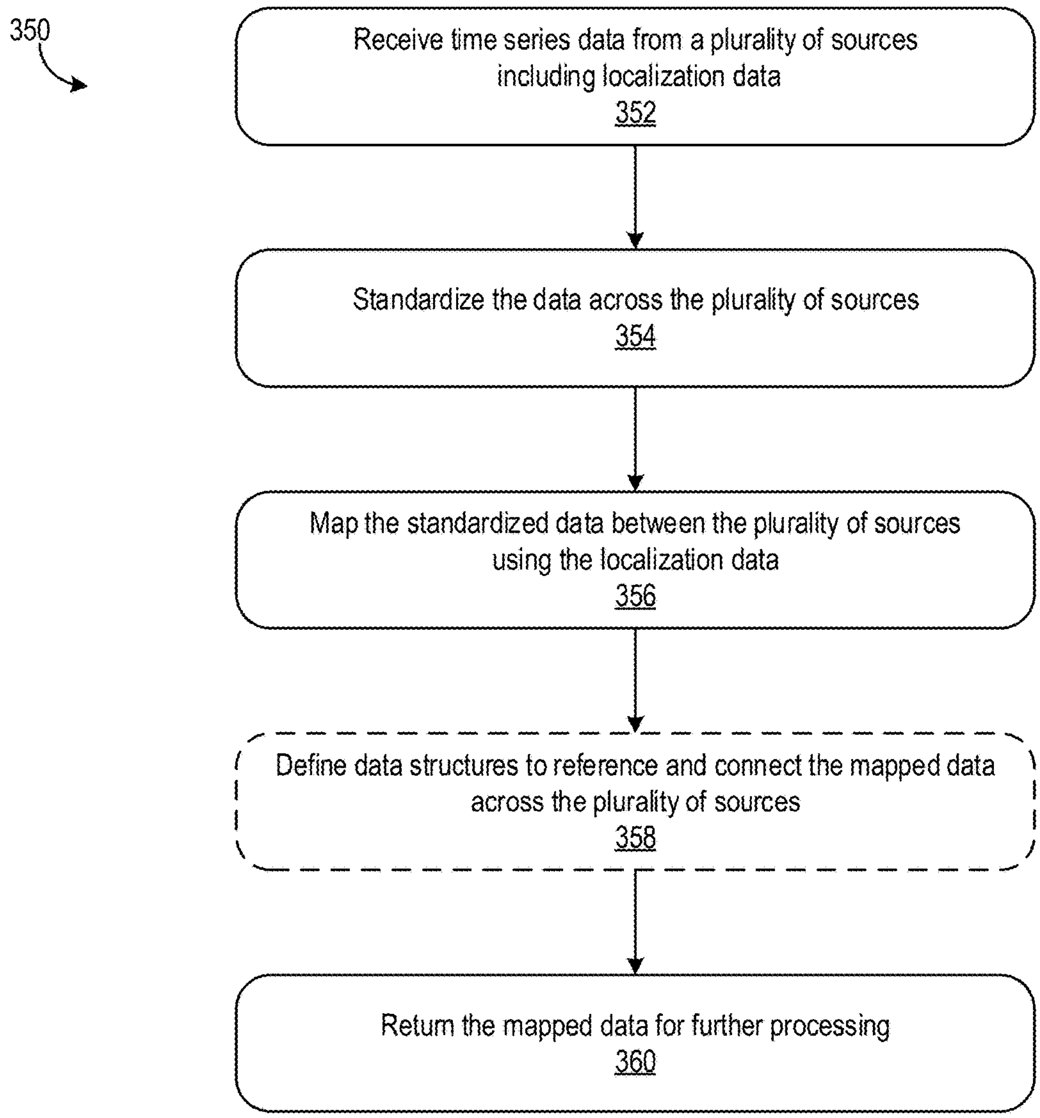
FIG. 3B is a flowchart of a process for homogenizing data that is used to perform the disclosed techniques.

FIG. 3B is a flowchart of a process 350 for homogenizing data that is used to perform the disclosed techniques. The process 350 can be performed to translate data across time series to a standardized format so that the data can be further processed to make accurate and robust determinations, such as in the process 300 described in FIG. 3A (e.g., determining current energy costs, determining energy costs over past periods of time, projecting energy costs for future periods of time). The process 350 can be performed by the computer system 102. The process 350 can also be performed by one or more other computing systems, devices, computers, networks, cloud-based systems, and/or cloud-based services. For illustrative purposes, the process 350 is described from the perspective of a computer system.

Referring to the process 350, the computer system can receive time series data from a plurality of sources, including localization data in block 352. Refer to FIG. 3A for further discussion about the time series data. The localization data can include a map between location names in the facility, such as pallet locations, rooms, zones, and/or blast freezers/cells. The localization data can be provided by a WMS. The localization data typically may not be stored in a centralized database. Rather, the localization data can be stored locally at devices of relevant users in the facility, such as a general manager. Similarly, data about refrigeration system assets may be stored in random devices and/or local files on devices of the relevant users (or an RCS as described herein), rather than in some standardized format in a data store or other system associated with the facility. Because the data can be stored in various devices and/or local folders, the data may also be stored as different types of data and/or formats.

In block 354, the computer system can standardize the data across the plurality of sources. Standardizing the data can include generating a standard set of data fields, with standardized labels across all facilities (or a single facility) or a quantity of facilities. As an illustrative example, pallet history tables from WMS data can be formatted the same way, regardless of the WMS system from which those tables are derived. The same can apply to RCS data, regardless of the RCS data type and/or original formatting. Other standardization examples are also possible. Standardizing the data is beneficial in order to scale calculations, analysis, and/or optimization routines from one facility to the next facility or within a particular facility.

The computer system can map the standardized data between the sources using the localization data (block 356). The localization data can be collected and standardized and mapped between systems (e.g., WMS locations and blast cells, energy used by assets in a particular room in the facility, energy used by a particular blast cell). The mapping of localization data can also be beneficial to further build data structures and simplify how data is referenced and connected between different parts of a system associated with each facility or a group of facilities. Therefore, the mapped, standardized data can be used to further standardize and simplify processes in accessing data and/or joining data between systems to generate robust and accurate determinations.

The computer system can optionally define data structures to reference and connect the mapped data across the sources (block 358). Finally, the computer system can return the mapped data for further processing (block 360). Returning the data can include storing the data in a data store. The data can then be retrieved by the computer system and used to make determinations to optimize efficiency in the warehouse. For example, the data can be used to determine energy costs per pallet over one or more past periods of time. The data can also be used to project energy costs per pallet over one or more future periods of time. The data can also be used to determine blast profit margin, blast cell energy costs, optimized blast schedules, and/or recommendations to adjust existing blast schedules and blast freezing processes.

FIGS. 4A, 4B, 9A, 9B, and 9C illustrate example graphical user interfaces (GUIs) for presenting information about blast cell operations. Information about the blast cells can be presented in a dashboard presented at a variety of user devices and/or computing systems, including but not limited to mobile devices (refer to FIGS. 4A and 4B) and/or computer systems (refer to FIGS. 9A, 9B, and 9C). The dashboards can provide blast cell visualization and optimization information to relevant users of a facility, such as managers, operators, and facility workers. For example, the dashboards can visualize blast cell-related data to help facility users track and optimize their blast cycles. As shown and described in reference to the GUIs of FIGS. 4A, 4B, 9A, 9B, and 9C, the dashboards can include visualizations of one or more of the following features: active blast cell visualization, including idle time, blast cell cost(s), blast cell checks and/or verification, blast cell history visualization (e.g., plots, graphs), current blast cell visualizations (e.g., plots, graphs), product and/or customer information, blast cell logs, blast cell controls, and/or text messages or other types of notifications for current blast cell conditions and/or control.

The dashboards can present a variety of information relating to blast timing. As illustrative examples, the dashboards can present suggested blast time(s) (which may be determined using the disclosed technology), current blast times (e.g., how much time that each pallet of items has been undergoing a blast freezing process so far, how much time a particular blast cell has been activating in a current blast freezing process), total blast time (e.g., total time that each pallet is blasted once a blast freezing process, or cycle, is complete, total time that the blast cell was activated in the blast freezing process), states of each blast cell (e.g., on, off, defrost, error), temperature(s) of supply and return air recorded during one or more blast freezing processes (e.g., cycles), blast schedules (e.g., if the blast cell is to be turned off and on, or pulsed, to reduce energy costs), historical timing blast information (e.g., how long pallets of items have been sitting in a blast cell and/or how long the pallets of items have been blasted in a blast freezing process during past periods of time), warnings or other notifications of temperature measurements in and/or around a blast cell (and/or temperature of a pallet of items) that are outside of expected temperature ranges, reminders for operators and other relevant users to take temperature probe measurements in the blast cell, pallets of items, and/or facility, and/or indications of what blast cell and/or pallet should be used to capture the temperature probe measurements.

The dashboards can present a variety of information relating to blast cell loading. As illustrative examples, the dashboards can present an appointment schedule of items (if available) indicating times at which particular pallets of items are to be placed in one or more blast cells, identification of blast cells in which to put particular pallets of items (which can be based on pallet and/or item identifiers), identification of locations in the blast cells in which to put the particular pallets of items, identification of which items are to be put and/or are put in which blast cell pallet/item locations, identification of customers to whom the pallets of items in the blast cell(s) belongs, weights of the pallets of items/items themselves that are placed in each blast cell, and other pallet and/or item-specific information for the pallets of items/items themselves that are put in the blast cells.

The dashboards can additionally or alternatively present a variety of information relating to blast metric KPIs. For example, the dashboards can present KPIs as pounds per cell per hour, which can indicate current, projected, future, and/or recommended throughput. The dashboards can present KPIs as dollar (or other currency) per hour in terms of electrical costs to indicate current, projected, and/or future energy costs for operating one or more of the blast cells. The dashboards can present KPIs as quantity of manual interventions in blast schedules by users in the facility over a particular period of time (e.g., past, current, and/or future period of time). Various other KPIs can be generated and presented in the dashboards to measure blast optimization and operations in the particular facility.

Figure 4A:
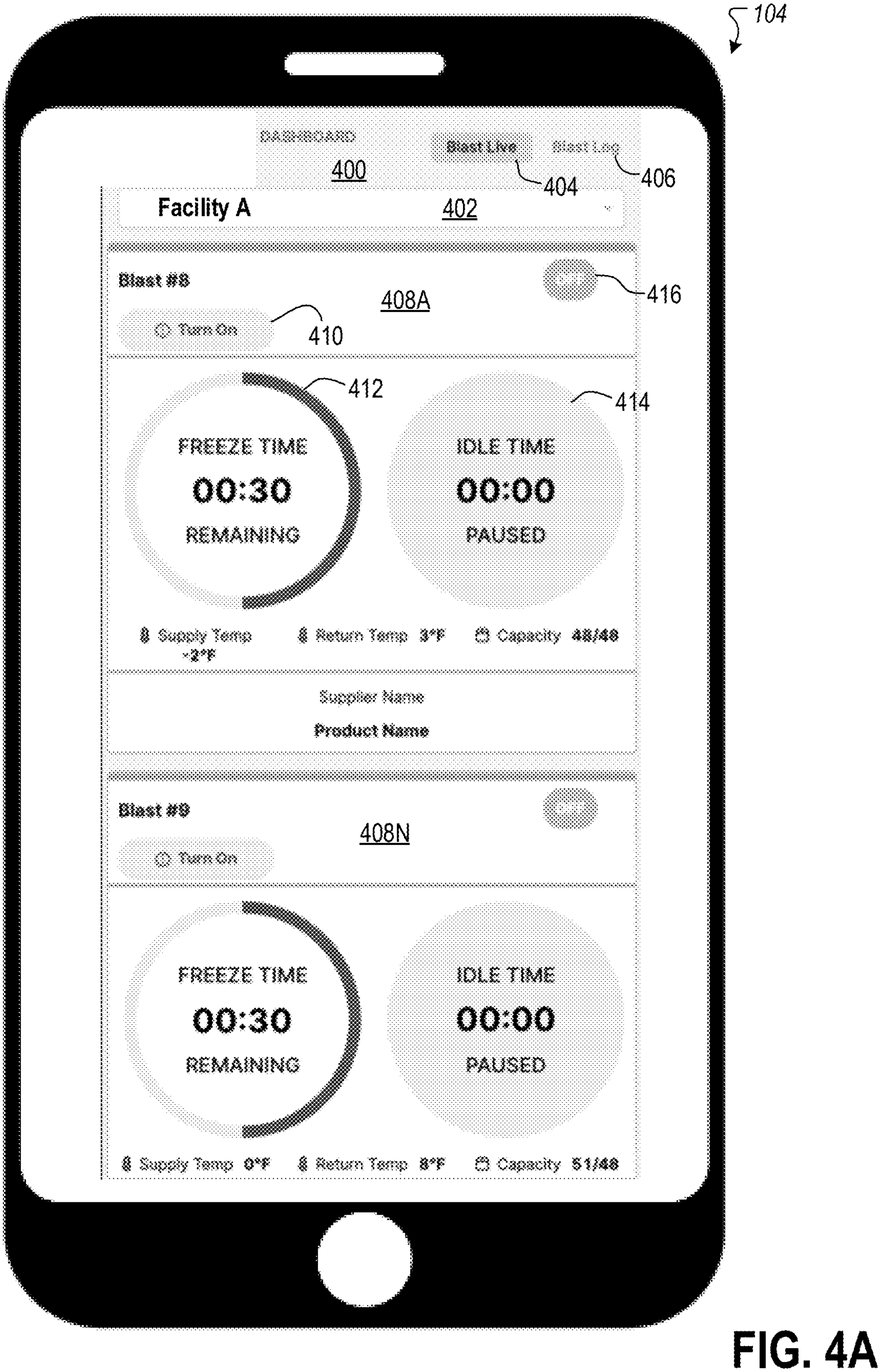
FIGS. 4A and 4B illustrate example graphical user interfaces (GUIs) for presenting information about blast cell operation at a mobile device.
Figure 4B:
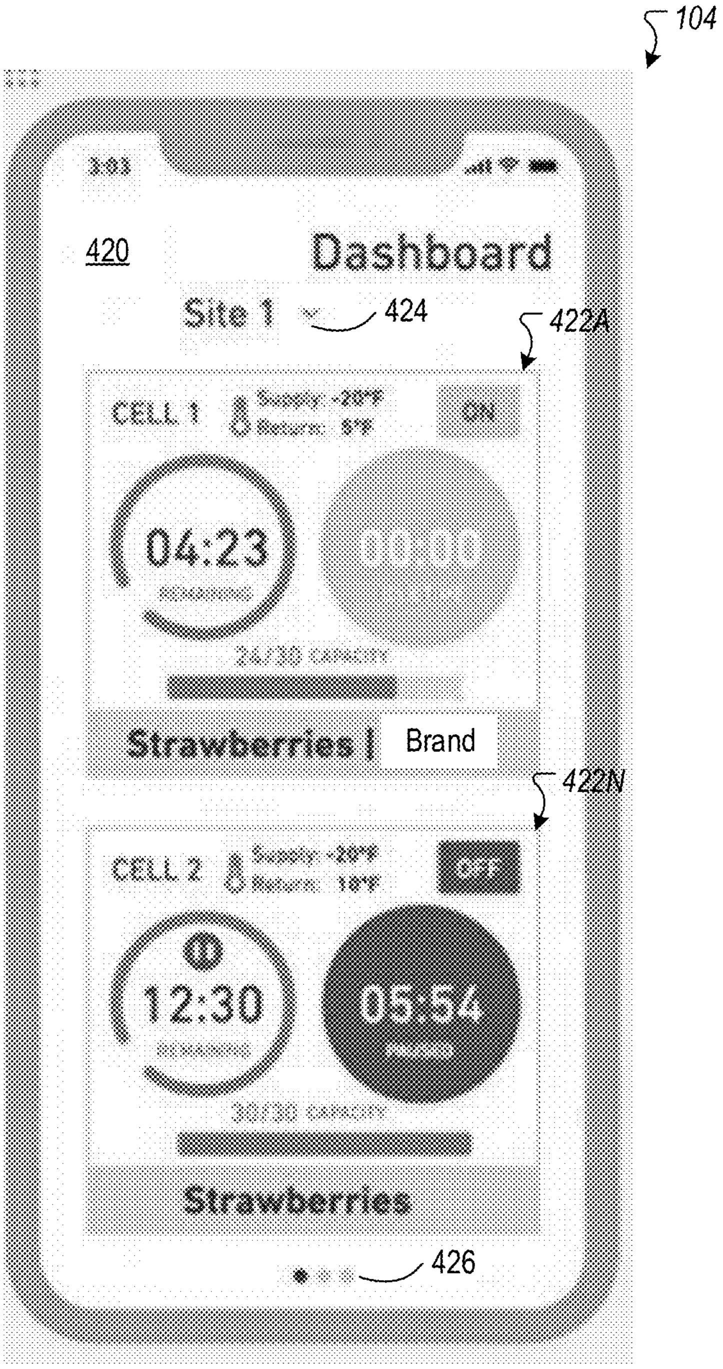

Referring to FIGS. 4A and 4B, FIG. 4A illustrates an example GUI 400 for presenting information about blast cells at a mobile device, such as the user device 104. The GUI 400 can be a dashboard similar to the GUIs described in reference to FIGS. 9A, 9B, and 9C. For example, the GUI 400 can present selectable options 404 and 406, which can be selected via user input at the mobile device 104 to view live information about blast cells in a particular facility (option 404) and a log of information about blast cells for the particular facility (option 406). The GUI 400 is illustrated from the perspective of selecting the option 404, to view live information about the blast cells in the particular facility.

The GUI 400 may also include a menu 402, which can be a dropdown menu configured to provide the user with selection of facilities of which to choose from. The user can provide user input indicating selection of any of the listed facilities, thereby causing the GUI 400 to be updated in real-time to reflect the live blast cells information for the user-selected facility. In the example of FIG. 4A, the user has selected Facility A from the menu 402.

Similar to the other GUIs described herein, the GUI 400 includes modules 408A-N, which can present information about each of the blast cells in the user-selected facility. When presented at a mobile device, the user can provide a vertical and/or horizontal scrolling input to view additional modules for other blast cells in the facility. In the present example, the modules 408A and 408N are shown for Blast #8 and Blast #9, but the user can provide vertical scrolling input (e.g., scrolling from a bottom of the screen to a top of the screen) to view modules for more blast cells associated with the facility.

The modules 408A-N can provide a variety of information and/or control options for each of the blast cells in the facility. This information can be updated in real-time, as conditions are detected in the blast cells and/or controls are received/executed in the facility. As an illustrative example, the module 408A corresponds to Blast #8 and includes a visual element 416 indicating that the blast cell is turned off, a selectable option 410, which, when selected, can cause a blast cycle to be started/turned on in the blast cell, a visual element 412 indicating a remaining amount of freeze time for the blast cell, and a visual element 414 indicating an amount of idle time associated with the blast cell. The visual elements 412 and 414 can be updated in real-time as changes are made to the blast cycle at the blast cell and/or as the blast cycle continues/is performed.

For example, the visual element 412 can be a circle having an indicia (e.g., color, pattern) around the circle's outer circumference visually indicating remaining freeze time for the blast cell. As the freeze time goes down (gets closer to 00:00), the indicia can automatically encompass greater amounts of the circle's outer circumference. Once the freeze time is 00:00, an entire outer circumference may be visually presented with the indicia. The visual element 412 may also include numeric indicators of the remaining freeze time, which can be presented as a timer at a center of the circle.

The visual element 414 can be a circle. In some implementations, the visual element 414 can be presented with indicia different than the indicia of the visual element 412 to visually assist the user in understanding what is shown in the module 408A for the particular blast cell. The visual element 414 may include a timer and/or textual information indicating a status of idle time, whether the blast cycle has been paused, etc. As an example, the user can select the visual element 414 to cause the blast cycle in the Blast #8 to be paused. The visual element 414 can be updated to indicate that the cycle is paused and a timer can start. The timer can be visually presented in the visual element 414, as shown in the GUI 400. When the blast cycle is paused, the visual element 412 can also be updated. For example, updating the visual element 412 can include stopping the indicia from continuing to encompass the outer circumference of the circle (until the blast cycle is resumed) and stopping the timer indicating remaining freeze time (until the blast cycle is resumed).

Figure 9A:
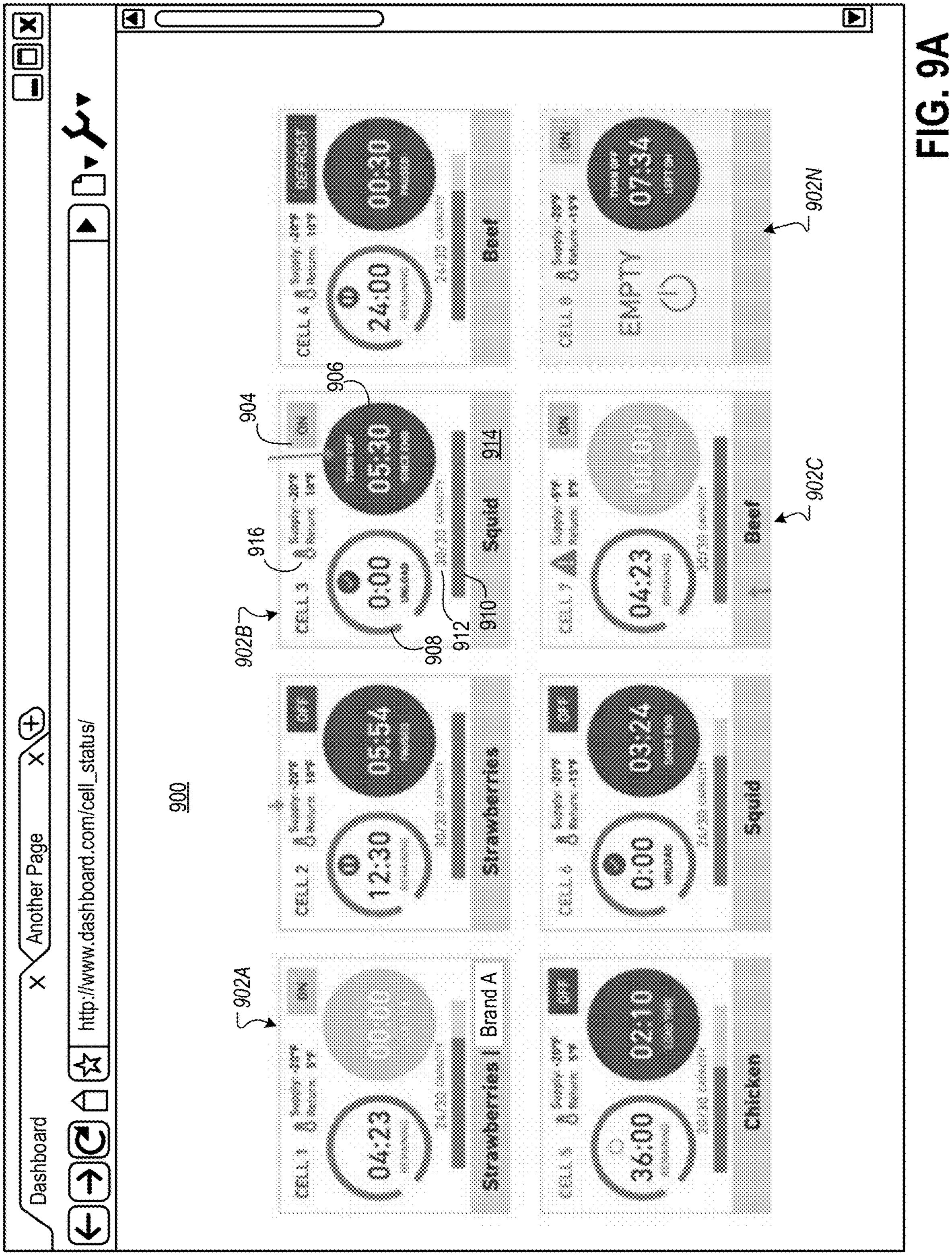
FIGS. 9A, 9B, and 9C illustrate example GUIs for presenting information about blast cells.
Figure 9B:
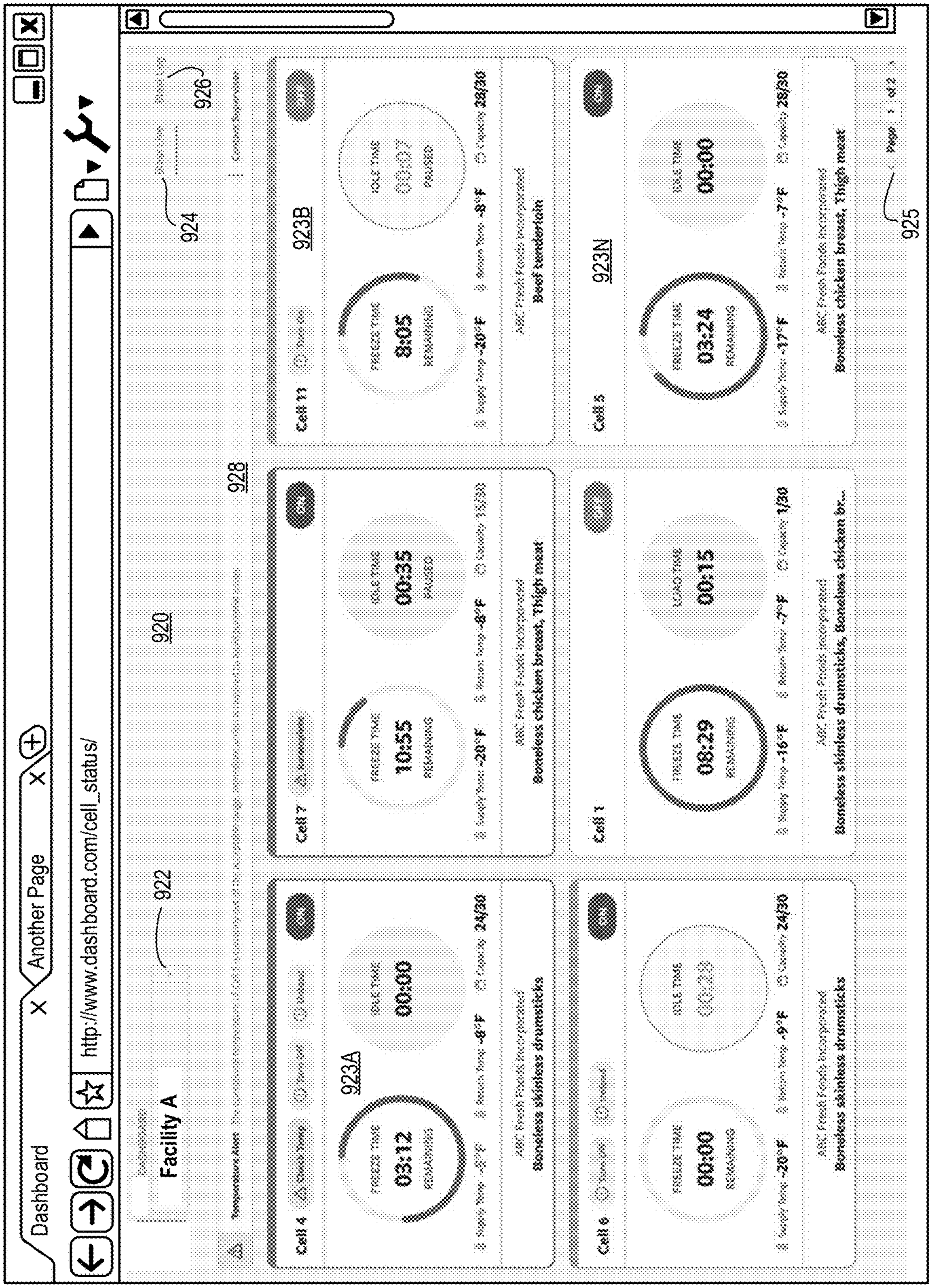
Figure 9C:
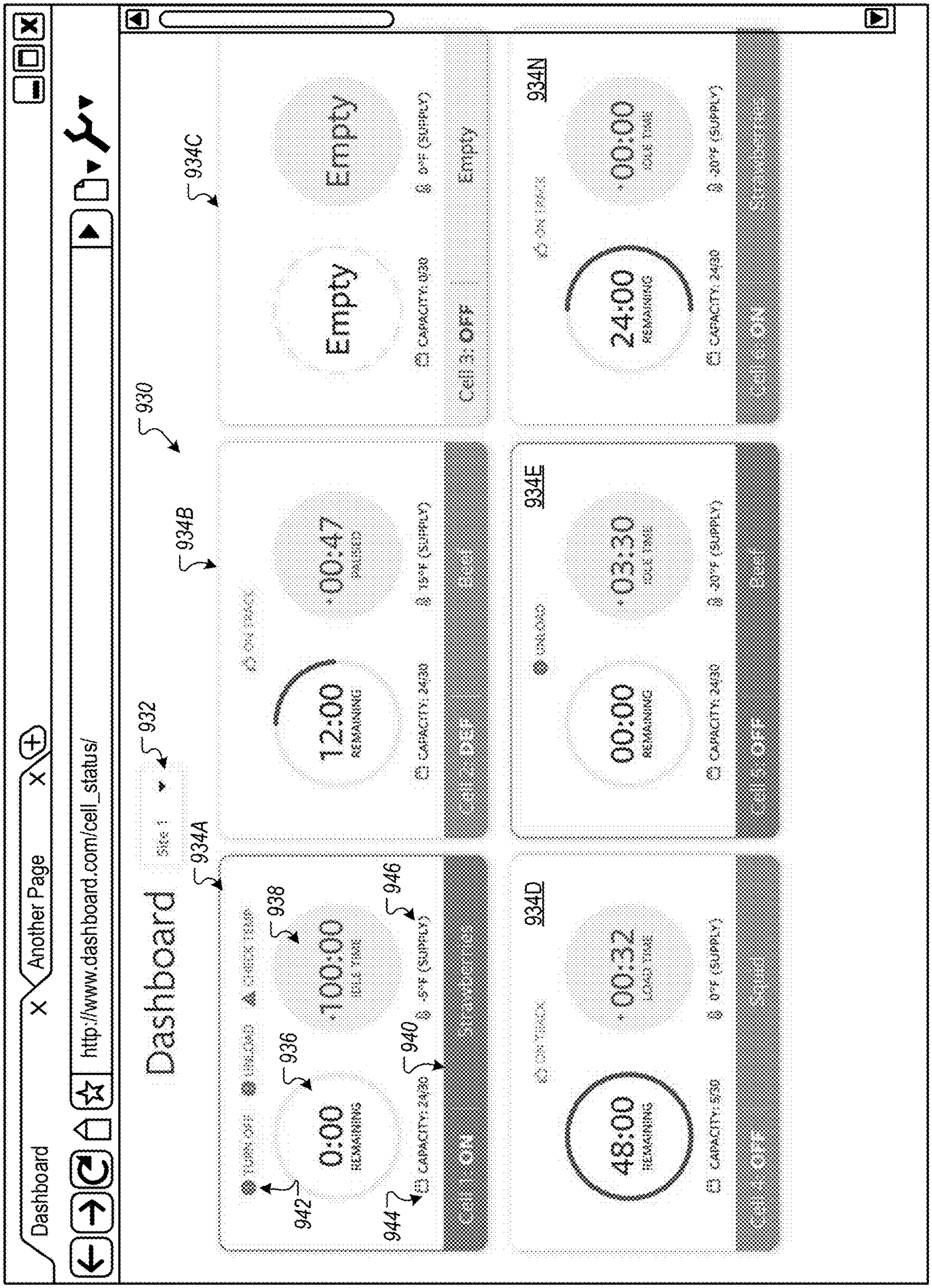

Each of the modules 408A-N may also include one or more other relevant information about each of the blast cells including but not limited to a supply temperature, a return temperature, a capacity, a supplier name or other identifying information, and/or a product name or other identifying information. Refer to FIGS. 9A, 9B, and 9C for further discussion about information that can be presented in the GUI 400.

FIG. 4B illustrates another example GUI 420 for presenting information about blast cells. The GUI 420 is similar to the GUI 400 described in reference to FIG. 4A. The GUI 420 can be presented as a dashboard and/or mobile application at user devices such as mobile phones, smartphones, tablets, and/or other types of mobile computing devices. The GUI 420 can be presented at the user device 104, as an example.

The GUI 420 can present similar or same information as the GUI 400 described in reference to FIG. 4A. In some implementations, the GUI 400 can present the same or similar information as described in reference to FIGS. 9A, 9B, and 9C. For example, the GUI 420 can present modules 422A-N for outputting/presenting information about each blast cell in a particular user-selected facility. Refer to the modules 408A-N described in reference to FIG. 4A for additional discussion. The GUI 420 can also include a menu 924, which can provide a dropdown menu of facilities from which the user can choose. When the user selects one of the facilities presented in the menu 424, the GUI 420 can be automatically updated at the user device 104 to reflect the modules 422A-N for blast cells that are associated with the user-selected facility.

In brief, each of the modules 422A-N can present information such as a supply temperature, return temperature, indicator of whether the blast cell is turned on or off, a visual element (e.g., circle element) indicating how much time remains on a blast cycle for the cell, a visual element (e.g., another circle element) indicating whether the blast cycle has paused, how long the cycle has been paused for, whether the blast cell has been idle, and/or how long the blast cell has been idle for. Refer to the visual elements 412 and 414 described in FIG. 4A for further discussion. The modules 422A-N may additionally or alternatively present information indicating a capacity of the respective blast cell and/or a visual element indicating a fullness of the blast cell (e.g., whether the blast cell is reaching or is at full capacity). The visual element may include a rectangular bar, which can be filled with a particular indicia (color or pattern), the indicia corresponding to how full the blast cell may be. If the blast cell is at full capacity, as shown by the module 422N, then the entire rectangular bar can be filled with the particular indicia.

In some implementations, the GUI 420 may include a toggle feature 426, which can indicate how many more views (or pages) of blast cells are available to view in the GUI 420. The toggle feature 426 can also be updated with different indicia to reflect a page or view that the user is currently on in the GUI 420. To move between the pages or views, the user can provide horizontal scrolling or swiping input at the GUI 420 (e.g., left to right, right to left). In response to the user input, the GUI 420 can be automatically updated to present modules for other blast cells in the user-selected facility. In response to updating the GUI 420, the toggle feature 426 can also be updated to visually show which page or view the user is now looking at in the GUI 420.

Figure 5A:
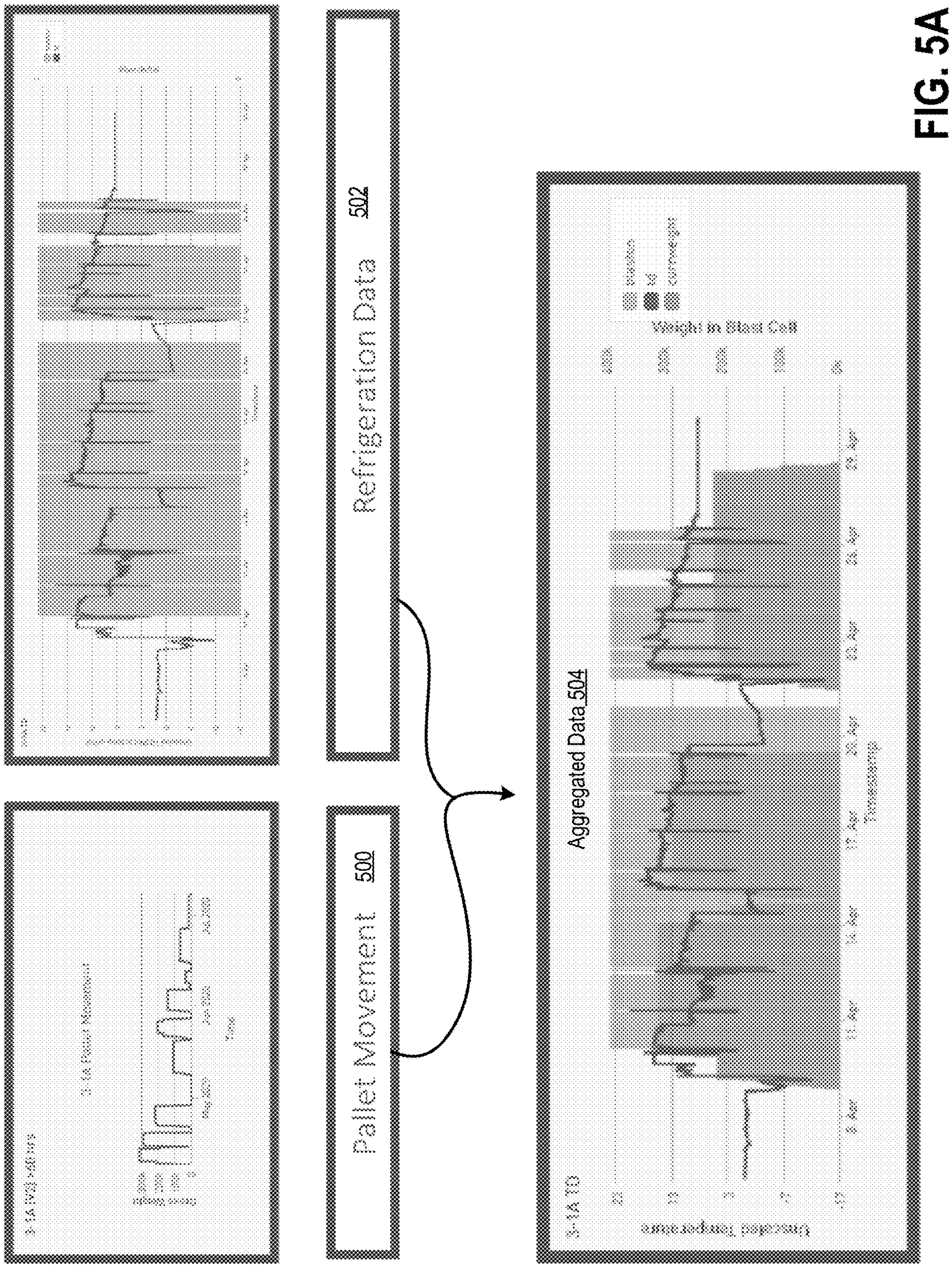
FIGS. 5A and 5B illustrate example data used to simulate and project energy costs per pallet.
Figure 5B:
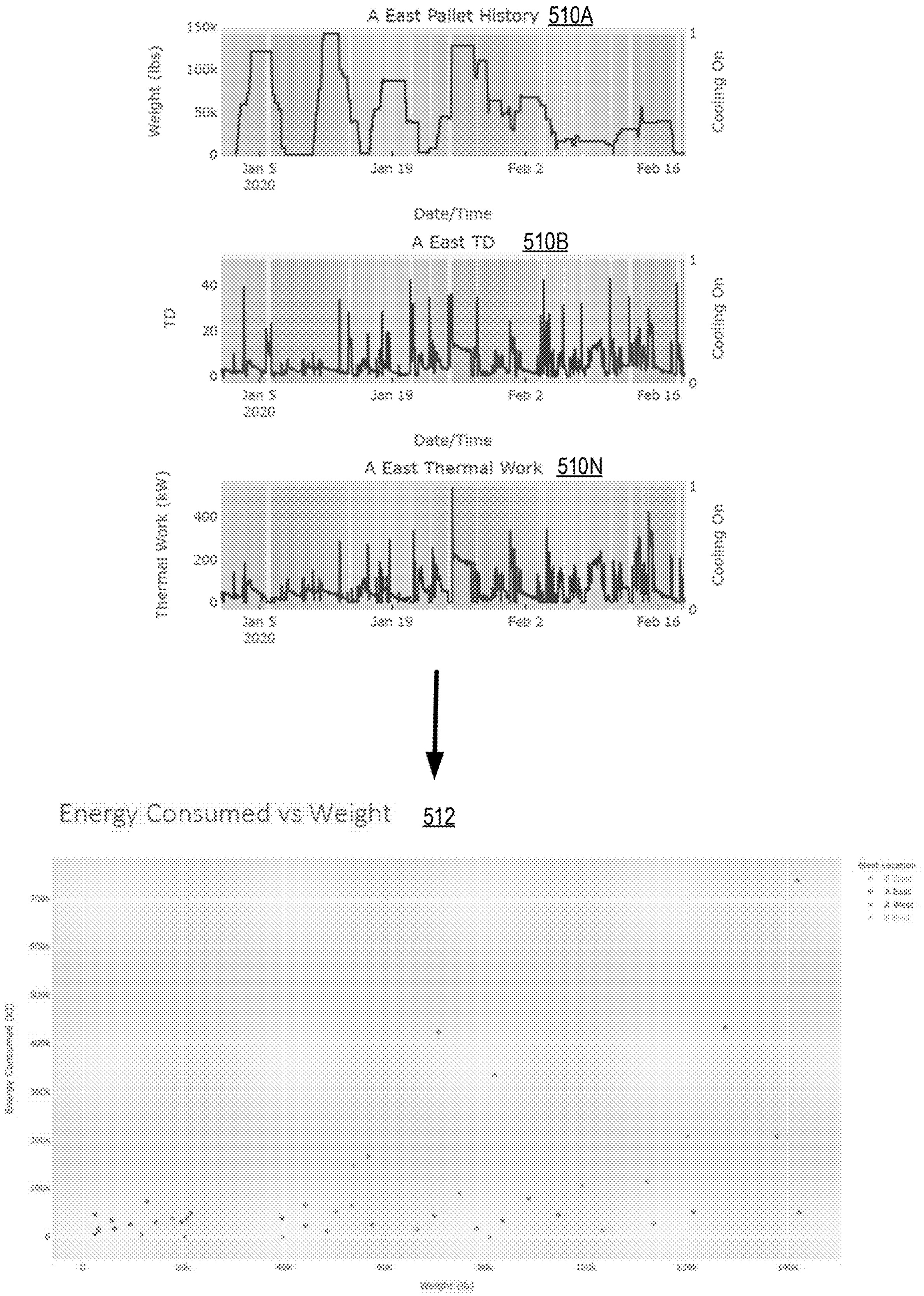

FIGS. 5A-B illustrate example data used to simulate and project energy costs per pallet. As described herein, various types of data can be retrieved and/or received, then used by the computer system described herein to determine the projected energy costs per pallet. For example, as shown in FIG. 5A, the computer system can receive pallet movement data 500 and refrigeration data 502. The computer system can perform processing techniques described herein to aggregate, combine, or otherwise identify relationships between the data 500 and 502 to generate aggregated data 504. The aggregated data 504 can then be used in calculations and other algorithms to determine the projected energy costs per pallet for one or more periods of time (e.g., a current time, future periods of time).

In some implementations, the computer system can further process the pallet movement data 500 in order to track whether and when the associated pallet is physically placed in a blast cell. The pallet movement data 500 can include scanned information for the pallet as the pallet moves throughout a facility. For example, the pallet can be automatically scanned (e.g., identifiers, labels, or barcodes on the pallet can be scanned by scanning devices, cameras, etc.) at various points throughout a travel path in the facility (e.g., along/on conveyor lanes or belts). Those scans can be processed and analyzed by the computer system to track movement of the pallet in the facility and identify when the pallet is entering or otherwise inside the blast cell. Many of the scans, however, may not relate to movements of the pallet. Thus, the computer system can implement additional processing techniques to differentiate between the scans and identify those that are relevant to the movement of the pallet. Differentiating between the scans can include detecting warp types in the scanned data, which can indicate movement of the pallet. Differentiating between the scans can include determining whether the scans are quality control scans. Quality control scans can have different types of indicators or codes in their scans, which provide information for different types of checks that are not related to pallet movement. In some implementations, differentiating between the scans can include analyzing location columns in the scanned data to see whether a location identifier has changed over subsequent scans. If the location identifier has not changed, then the computer system can determine that the pallet has not moved. In some implementations, the computer system can include a state machine to determine and track the movement of the pallet that enters and exits the blast cell. The determinations related to tracking the movement of the pallet can also be provided in one or more GUIs, dashboards, and/or portals described herein as a plugin.

The computer system can receive any other type of historic, real-time, or near real-time data about pallets in the facility, items, customers, refrigeration systems, blast cells, or the facility as a whole. For example, as shown in FIG. 5B, the computer system receives data 510A-N. The data 510A represents pallet history data, measured in weight, over a particular period of time for a particular facility. The data 510B represents TD data, measured in TD over the same period of time for the particular facility. The data 510N represents thermal work data, measured in kilowatts (KW) for operating the blast cells during the same period of time for the pallets represented by the data 510A at the particular facility.

Using the techniques described herein, the computer system aggregates the data 510A-N to model and simulate energy costs consumed by inbound pallets at the particular facility. The computer system can generate simulated data, such as graph 512, which indicates energy consumed based on pallet weight. The graph 512 can indicate energy consumed based on pallet weight for the particular facility. The graph 512 can also indicate energy consumed based on pallet weight for a plurality of facilities, including the particular facility. Sometimes, historic data for the particular facility can be used to extrapolate or otherwise simulate the projected energy consumed per pallet weight for one or more of the plurality of facilities. Sometimes, historic data for each of the plurality of facilities can be used to simulate their respective projected energy consumed per pallet weight data. The energy consumed per pallet weight data as shown in the graph 512 can be used by the computer system to further project energy costs per pallet at each of the plurality of facilities (or the particular facility), as described throughout this disclosure.

FIG. 6 illustrates example data and metrics used to determine blast cell energy costs per pallet. The blast cell energy costs can be determined by the computer system as described herein. In some implementations, the computer system can implement an algorithm configured to determine energy usage per room in the facility, then break down the energy usage per room in the facility to energy usage per blast cell, then further break down the energy usage per blast cell to energy usage per pallet in the blast cell. Timestamps indicating start and stop times of blast cycles can be used in combination with energy data for the facility to determine how much energy was used between the start and stop times of a particular blast cell. Information about pallets in the blast cell (as well as customer-associated information) can be used to apportion the energy usage in the blast cell to individual pallets and/or groups of pallets (e.g., pallets associated with the same customer).

In yet some implementations, similar techniques described herein in FIG. 6 can be used to determine an energy wastage metric per blast cell and/or per pallet (or per customer). For example, the energy wastage metric can be determined when pallets in the blast cell have completing their freezing processes but the blast cell is still operating. The techniques described herein can be performed by the computer system to apportion energy wastage to the blast cell and the individual pallets therein (or their associated customer(s)). The energy wastage metric can then be used by the computer system to optimize operations of the blast cell and more accurately determine when to turn on/off the blast cell and/or add/remove items from therein.

Various metrics can be used to determine blast cell energy costs, such as cost from energy and labor per pallet during a predetermined period of time and/or cost from energy and labor per pallet position during the predetermined period of time. These metrics can be derived from data such as product specification data 600. The product specification data 600 can include information about pallets of items that are or have been blasted at the facility. These metrics can also be derived from blast specification data 602, which can include information about components of blast cells in the facility, how long and/or when blast cells are turned on, etc. These metrics can also be derived from tonnage check data 604, which can include information such as blast product/item tonnage that is refrigerated. Using the calculations described below, the computer system can generate cost analysis data 606. The cost analysis data 606 can include, for example, total heat load, total electrical load, average power draw, total electricity usage cost, total electricity demand cost per month, and/or total labor cost. Any one or more of these values can then be used to determine a total monthly cost for operating blast cells in the facility and/or a total cost per pallet.

More particularly, to generate the cost analysis data 606, power usage for blast freezing items over time can be calculated using an algorithm in which total kW of compressors (e.g., all the compressors, a subset of the compressors) is multiplied by cooling capacity (tonnage) of each blast cell during timestamps that the blast cell is activated/turned on. A formula used in this algorithm can include:

$$P(t) = \frac{\sum_c T^c_{evap} s_c(t)}{\sum_i T^i_{evap} s_i(t)} \cdot P_{Comp}(t)$$

In this formula, tonnage $$T^c_{evap}$$

for each evaporator, which corresponds to blast cell c and is measured in units of energy, can be multipled by the blast cell c's solenoid open/closed time series vector $s_c(t)$.

$$T^c_{evap}$$

indicates a cooling capacity (tonnage) of blast cells. Tonnage can act as a weight to total kW for all compressors when the blast cell is on (solenoid is open). The time series vector can include a value of 1 when the solenoid is open and a value of 0 when the solenoid is closed. The solenoid vectors multiplied by the tonnanges (now a time series with the tonnage at each timestamp that the blast cell is on) for each blast cell then is added together/summated to achieve a total active tonnage at every timestamp. This summation can be divided by a total active evaporator tonnage at each timestamp, which can include evaporators that are not in the blast cells. Like the numerator in the above formula, the tonnage of each evaporator (blast and non-blast cell evaporators)

$$T^i_{evap},$$

where i stands for each evaporator, can be multiplied by the evaporator's state time vector (e.g., whether is it open or closed). This ratio at each timestamp can indicate a percentage of power draw from all compressors that correspond to the blast cell evaporators. Multipling (the dot product) the ratio at each timestamp by a total power draw at each time of all the compressors can return an amount of power used for operating the blast cells.

An energy cost that corresponds to the compressors (for a predetermined period of time, such as a month) can be approximated by multipling a total energy cost for each month by the ratio of the compressor power usage over the total power usage, as indicated by the following formula:

$$r_{Comp}(t) = r_{tot}(t) \cdot \frac{P_{Comp}(t)}{P_{Main}(t)}$$

$P_{Comp}(t)$ can indicate kW of blast compressors over time. A percentage of total power used by the compressors over time or some predetermined period of time can also be used in the above formula. r(t) indicates energy cost over time for the compressors, which can be measured by a total utility bill for each month. To determine the total cost over time, $r_{tot}(t)$, the total utility bill for each month can be multiplied by compressor kWh/main total kWh for each month. main total kWh can indicate the percentage of the total power used by the compressors over time or some predetermined period of time.

The power used per pallet in a blast cell can be a total power used for blast P(t) divided by a total number of pallets in the blast cells at that time N(t). Alternatively, total weight in blast cells at each timestamp can be used to determine the power used per pallet as such:

$$P_{pal}(t) = \frac{P(t)}{N(t)}$$

To compute energy cost to blast freeze each pallet over time given the cost per kW price $r_{kW}$, the following calculation can be performed by the computer system:

$$\text{cost}_{pal}(t) = P_{pal}(t) \cdot r_{kW}$$

For determining total energy cost per month per pallet, the following calculation can be performed by the computer system:

$$\text{cost}^{month}_{pal}(t) = \frac{r_{Comp}(t)}{P_{Comp}(t)} \cdot \frac{P(t)}{N(t)} = \frac{r_{Comp}(t)}{P_{Comp}(t)} \cdot P_{pal}(t)$$

In the above calculation, the cost per kW price can be given by the total monthly cost for all compressors divided by the total power of the compressors (regardless of whether a blast cell is on or off). Multiplying this at every timestamp by a power draw per pallet in a blast cell can return a cost at every timestamp of energy consumed for each pallet. Finally, since warehouse data indicates times that each pallet is located inside the blast cell, the total cost of each pallet in the blast cell can be determined by multiplying the amount of time each pallet is inside the blast cell by $$\text{cost}^{month}_{pal}(t).$$

A distribution of this total cost for all the pallets can be plotted, in some implementations.

FIG. 7A illustrates an example storage facility layout 700 with blast cells. The storage facility 700 can include dock areas 702A-N, storage location aisles 704A-N, and blast cell areas 710A-N. The storage facility 700 can be any type of warehouse, distribution center, or other type of facility for storing items and/or moving items between parties (e.g., shippers/providers and end-consumers). The dock areas 702A-N can be configured to receive inbound items (e.g., pallets of items) from trucks or other delivery vehicles. The dock areas 702A-N can also be configured to receive items from storage in the facility 700 to be shipped from the facility 700 to customers or other item recipients.

The inbound items can be routed to one or more locations in the facility 700. The inbound items can be routed to one or more of the storage location aisles 704A-N for placement in one or more storage locations at the aisles. In some implementations, the storage location aisles 704A-N can be grouped in one or more storage rooms or storage zones. Each of the storage rooms or zones or each of the storage location aisles 704A-N can be configured to store items that satisfy one or more storage criteria (e.g., storage temperature, customer, item type, storage duration, item size). The inbound items can be additionally or alternatively routed to one or more of the blast cell areas 710A-N.

The blast cell areas 710A-N can each include one or more of the blast cells 114 described herein. Each of the blast cells 114 can be configured to receive items and operate to cool the items loaded therein. In the illustrated example of FIG. 7A, the blast cells 114 are arranged side-by-side and split by walls 712. In other examples, at least one of the blast cells 114 is arranged at a distance from an adjacent blast cell 114, or in other suitable configurations in the blast cell areas 710A-N.

FIG. 7B illustrates the example blast cell 114 described herein. The illustrative blast cell 114 includes a housing 722, an air suction channel assembly 724, a fan 732, and an intake plenum 734. The housing 722 can include an opening or door that can be used to load the blast cell 114 with pallets 730 of items 728. The housing 722 defines a bay space for supporting or otherwise holding the pallets 730 of the items 728 in rows or levels. In some implementations, the items 728 can be stacked on the pallets 730, and the pallets 730 are carried and held in the bay space of the housing 722 so that the items 728 can be cooled in the blast cell 114. The items 728, such as boxes or packages, can be stacked in multiple rows on each pallet 730, as mentioned above, and the items 728 in adjacent rows can be spaced apart by a separator to provide a room to allow air flow between the adjacent rows of items 728.

The fan 732 can be arranged relative to the intake plenum 734 to create air flow inside the blast cell 114 to cool the items 728 therein. The intake plenum 734 can be arranged at an upper side of the housing 722 of the blast cell 114. The intake plenum 734 provides a conduit for air flow between the rearward region and the forward region of the housing 722. In some implementations, the blast cell 114 can have more than one fan 732. The fan 732 can operate to pull air from a rearward region of the housing 722. The fan 732 can further operate to discharge the air toward a forward region of the housing 722 opposite to the rearward region.

In this example, the fan 732 is located at a rear-top of the housing 722 of the blast cell 114. In other implementations, the fan 732 can be located in other positions, such as at the bottom of the blast cell 114 or at one or both sides of the blast cell 114. In other embodiments, each blast cell 114 can include multiple fans, such as one at the top of the blast cell 114 and one at the bottom thereof. The fan 732 can take a variety of appropriate forms, including propeller fans, axial fans, and centrifugal fans. The fan 732 can be sized to provide the required volume of air across expected pressure drops for the overall circulation through the blast cell 114 when it is loaded partially and fully.

Cooling coils (e.g., evaporators) (not shown) can be placed in the blast cell 114 or adjacent to it. For example, the cooling coils can be placed against the upstream or downstream faces of the fan 732, or can be placed in the intake plenum 734 or another plenum or area where the air circulates so as to receive warmed air and provide cooled air. In other embodiments, the cooling coils can be placed out of the main air circulation for the blast cell 114, such as on the roof of a building, and a single bank of cooling coils can serve multiple blast cells. In such an instance, a pair of taps can be made into the intake plenum 734 or another part of the air circulation of the blast cell 114, where one tap can draw air out of the blast cell 114, and the other can return the cooled air into the blast cell 114, so that it can blend in with the main airflow of the blast cell 114.

Moreover, the fan 732 can be connected to a controller, such as one or more RCS, other controllers, and/or the computer system described herein. The controller controls the operation of the fan 732.

The air suction channel assembly 724 can include a plurality of air passages or air channels. Each of the air passages/channels can correspond to a different row or level inside the housing 722 where the pallets 730 of the items 728 are located/stored. For example, the channels of the air suction channel assembly 724 can be arranged between the rearward region of the housing 722 and the fan 732. Each of the channels can define a fluid pathway from a level in the housing 722 (e.g., a row of the pallets 730 of the items 728) toward the fan 732. The assembly 724 can be configured to direct air flow from the rearward region of the housing 722 toward the fan 732 through the fluid pathway. The air suction channel assembly 724 can be arranged in any other variety of configurations in order to direct the air flow in the blast cell 114.

Figure 8:
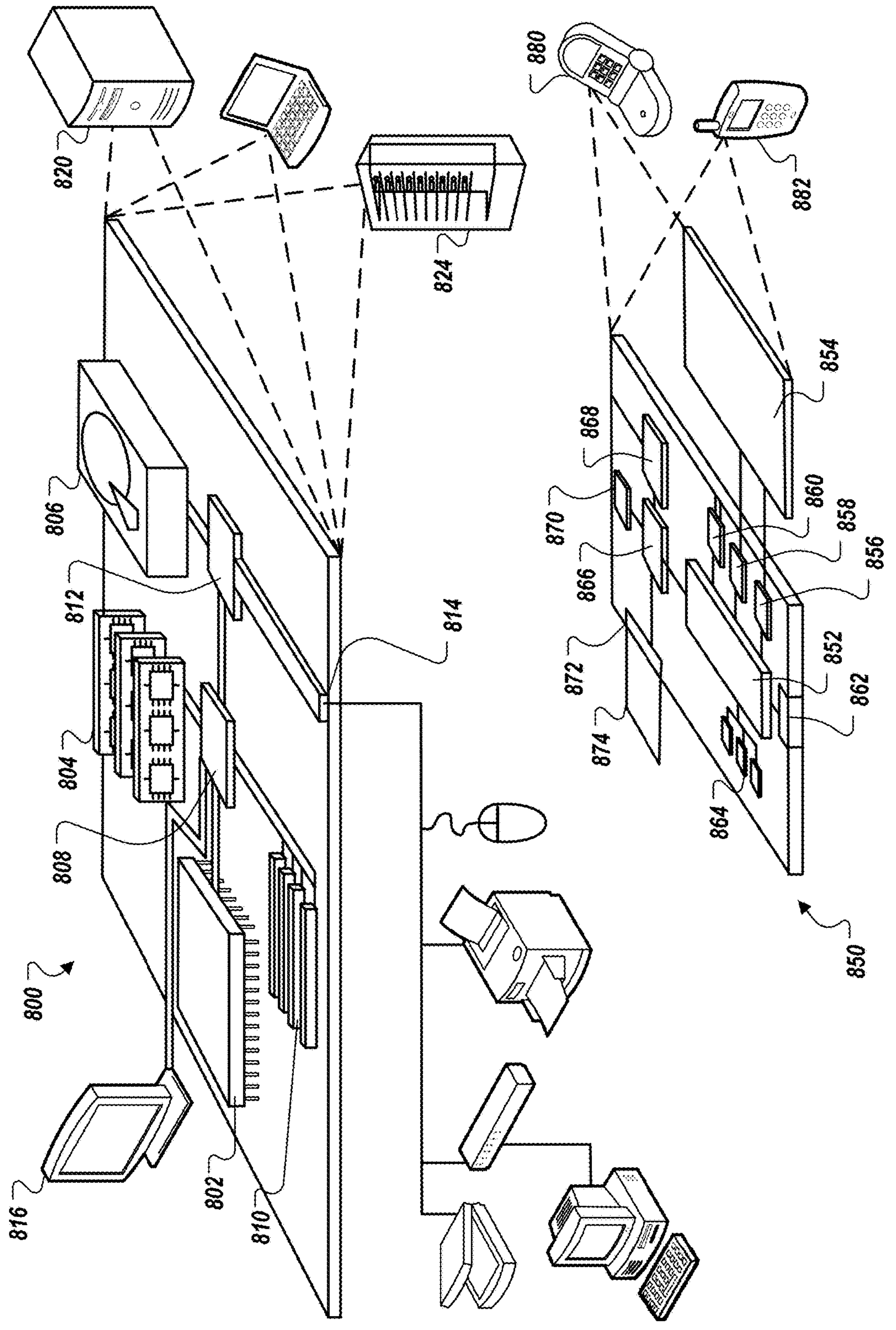
FIG. 8 is a schematic diagram that shows an example of a computing device and a mobile computing device.

FIG. 8 shows an example of a computing device 800 and an example of a mobile computing device that can be used to implement the techniques described here. The computing device 800 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 800 includes a processor 802, a memory 804, a storage device 806, a high-speed interface 808 connecting to the memory 804 and multiple high-speed expansion ports 810, and a low-speed interface 812 connecting to a low-speed expansion port 814 and the storage device 806. Each of the processor 802, the memory 804, the storage device 806, the high-speed interface 808, the high-speed expansion ports 810, and the low-speed interface 812, are interconnected using various busses, and can be mounted on a common motherboard or in other manners as appropriate. The processor 802 can process instructions for execution within the computing device 800, including instructions stored in the memory 804 or on the storage device 806 to display graphical information for a GUI on an external input/output device, such as a display 816 coupled to the high-speed interface 808. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 804 stores information within the computing device 800. In some implementations, the memory 804 is a volatile memory unit or units. In some implementations, the memory 804 is a non-volatile memory unit or units. The memory 804 can also be another form of computer-readable medium, such as a magnetic or optical disk.

The storage device 806 is capable of providing mass storage for the computing device 800. In some implementations, the storage device 806 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 804, the storage device 806, or memory on the processor 802.

The high-speed interface 808 manages bandwidth-intensive operations for the computing device 800, while the low-speed interface 812 manages lower bandwidth-intensive operations. Such allocation of functions is exemplary only. In some implementations, the high-speed interface 808 is coupled to the memory 804, the display 816 (e.g., through a graphics processor or accelerator), and to the high-speed expansion ports 810, which can accept various expansion cards (not shown). In the implementation, the low-speed interface 812 is coupled to the storage device 806 and the low-speed expansion port 814. The low-speed expansion port 814, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 800 can be implemented in a number of different forms, as shown in the figure. For example, it can be implemented as a standard server 820, or multiple times in a group of such servers. In addition, it can be implemented in a personal computer such as a laptop computer 822. It can also be implemented as part of a rack server system 824. Alternatively, components from the computing device 800 can be combined with other components in a mobile device (not shown), such as a mobile computing device 850. Each of such devices can contain one or more of the computing device 800 and the mobile computing device 850, and an entire system can be made up of multiple computing devices communicating with each other.

The mobile computing device 850 includes a processor 852, a memory 864, an input/output device such as a display 854, a communication interface 866, and a transceiver 868, among other components. The mobile computing device 850 can also be provided with a storage device, such as a micro-drive or other device, to provide additional storage. Each of the processor 852, the memory 864, the display 854, the communication interface 866, and the transceiver 868, are interconnected using various buses, and several of the components can be mounted on a common motherboard or in other manners as appropriate.

The processor 852 can execute instructions within the mobile computing device 850, including instructions stored in the memory 864. The processor 852 can be implemented as a chipset of chips that include separate and multiple analog and digital processors. The processor 852 can provide, for example, for coordination of the other components of the mobile computing device 850, such as control of user interfaces, applications run by the mobile computing device 850, and wireless communication by the mobile computing device 850.

The processor 852 can communicate with a user through a control interface 858 and a display interface 856 coupled to the display 854. The display 854 can be, for example, a TFT (Thin-Film-Transistor Liquid Crystal Display) display or an OLED (Organic Light Emitting Diode) display, or other appropriate display technology. The display interface 856 can comprise appropriate circuitry for driving the display 854 to present graphical and other information to a user. The control interface 858 can receive commands from a user and convert them for submission to the processor 852. In addition, an external interface 862 can provide communication with the processor 852, so as to enable near area communication of the mobile computing device 850 with other devices. The external interface 862 can provide, for example, for wired communication in some implementations, or for wireless communication in other implementations, and multiple interfaces can also be used.

The memory 864 stores information within the mobile computing device 850. The memory 864 can be implemented as one or more of a computer-readable medium or media, a volatile memory unit or units, or a non-volatile memory unit or units. An expansion memory 874 can also be provided and connected to the mobile computing device 850 through an expansion interface 872, which can include, for example, a SIMM (Single In Line Memory Module) card interface. The expansion memory 874 can provide extra storage space for the mobile computing device 850, or can also store applications or other information for the mobile computing device 850. Specifically, the expansion memory 874 can include instructions to carry out or supplement the processes described above, and can include secure information also. Thus, for example, the expansion memory 874 can be provide as a security module for the mobile computing device 850, and can be programmed with instructions that permit secure use of the mobile computing device 850. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 864, the expansion memory 874, or memory on the processor 852. In some implementations, the computer program product can be received in a propagated signal, for example, over the transceiver 868 or the external interface 862.

The mobile computing device 850 can communicate wirelessly through the communication interface 866, which can include digital signal processing circuitry where necessary. The communication interface 866 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 868 using a radio-frequency. In addition, short-range communication can occur, such as using a Bluetooth, WiFi, or other such transceiver (not shown). In addition, a GPS (Global Positioning System) receiver module 870 can provide additional navigation- and location-related wireless data to the mobile computing device 850, which can be used as appropriate by applications running on the mobile computing device 850.

The mobile computing device 850 can also communicate audibly using an audio codec 860, which can receive spoken information from a user and convert it to usable digital information. The audio codec 860 can likewise generate audible sound for a user, such as through a speaker, e.g., in a handset of the mobile computing device 850. Such sound can include sound from voice telephone calls, can include recorded sound (e.g., voice messages, music files, etc.) and can also include sound generated by applications operating on the mobile computing device 850.

The mobile computing device 850 can be implemented in a number of different forms, as shown in the figure. For example, it can be implemented as a cellular telephone 880. It can also be implemented as part of a smart-phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

FIG. 9A illustrates an example GUI 900 for presenting information about blast cells. The GUI 900 can be presented at a user device such as a computer, tablet, and/or laptop. The GUI 900 can be presented at a desktop. Similar to the GUIs presented and described in FIGS. 4C-F, the GUI 900 includes modules 902A-N, each of the modules 902A-N presenting information about a respective blast cell in a particular facility (such as a manual warehouse or cold storage facility, although the disclosed techniques can also be implemented in automated warehouses and cold storage facilities). The information presented in the modules 902A-N can be used by a relevant user to understand and visually see how each of the blast cells in the facility is being used (or not used). The information presented in the modules 902A-N can be used to optimize operations of one or more of the blast cells in the facility.

The modules 902A-N can be presented in the GUI 900 in a grid arrangement. Sometimes, the relevant user can scroll through the modules 902A-N to view additional or other modules for other blast cells in the facility. The user can scroll vertically (e.g., up and down). The user can scroll horizontally or laterally (e.g., left and right).

As an illustrative example of the modules 902A-N, the module 902B includes the following information for a blast cell identified as "Cell 3": (i) a countdown timer 908 indicating an amount of time left in a current blast cycle for the Cell 3, (ii) a conditions timer 906 indicating an amount of time that the Cell 3 has been operating in a particular stage of the blast schedule, (iii) a state 904 of the Cell 3, (iv) product information 914 in the Cell 3, and (v) temperature information 916 for the Cell 3.

The countdown timer 908 can also include a text indication of how much time remains in the current blast schedule/cycle and/or what a next expected stage is for the blast cell. For example, the text indication can indicate that a certain amount of time is remaining in a current stage of the blast schedule. As another example, the text indication can indicate that the timer 908 has reached a time of 0:00, which can mean the blast schedule is complete and the items inside are ready to be unloaded from the blast cell. One or more other text indications are also possible.

The countdown timer 908 can be automatically started and stopped by the computer system described herein based on signals that are generated by sensors in and/or around the blast cell. For example, the one or more temperature sensors/probes can be positioned near the items inside the blast cell. Temperature values sensed by the temperature sensors can be transmitted to the computer system and processed by the computer system to determine a temperature of the items. The computer system can determine whether the current temperature of the items indicates that the items are not yet cooled to a desired temperature, whether the items have reached the desired temperature, etc. Based on this determination, the computer system can start or stop the countdown timer 908 (e.g., stop the countdown timer 908 to indicate that the desired temperature for the items has been reached and that the items should be removed from the blast cell, start the countdown timer 908 to indicate how long the items should remain inside the blast cell until the desired temperature is reached). The computer system can also use this determination to generate instructions for operating the blast cell, such as increasing an amount of time that the blast cell operates in order to cool the items therein to the desired temperature and/or decreasing the amount of time that the blast cell operates because the items placed therein are nearing the desired temperature. The instructions that are generated can also include, for example, instructions to turn off the blast cell, turn on the blast cell, and/or pause the blast cell.

The conditions timer 906 can include an incremental timer that shows an amount of time that the particular stage occurs in real-time at the Cell 3. The conditions timer 906 can include a text indication of what stage of the blast schedule the Cell 3 is currently operating in. For example, the text indication can indicate how long the blast cell has been or is idle (e.g., being loaded, has not yet started the blast schedule), how long the blast cell is paused, how long since the blast schedule ended (e.g., while the items are still inside the blast cell and have not yet been unloaded, while the items are being unloaded from the blast cell, after the blast cell has been unloaded), how long the blast cell is being loaded with the items, and/or how long the blast cell has been left in a turned off state (e.g., if the blast cell is empty and/or has not yet been loaded with any items). One or more other text indications are also possible.

The state 904 can include a text indication of a current state of the blast cell. For example, the state 904 can be "on," "off," "defrost," etc. The state 904 can be updated and presented in the GUI 900 in real-time or near real-time as the computer system described herein receives sensor signals from sensors inside and/or surrounding the blast cell. The sensor signals can indicate a current state of the blast cell, which the computer system can process to then update the state 904 presented in the module 902A-N corresponding to the blast cell.

The product information 914 can include a product type that is loaded into the Cell 3. The product information 914 can additionally or alternatively include customer information corresponding to the products that are loaded into the Cell 3 (e.g., customer name, customer ID).

The temperature information 916 can include a supply air temperature to the Cell 3. The temperature information 916 can additionally or alternatively include a return air temperature from the Cell 3. The supply air is provided to the Cell 3 by refrigeration and/or cooling system components in the facility. The return air is expelled from the Cell 3 as part of the cooling process.

Sensors positioned on, inside, and/or around the blast cell can be configured to continuously sense temperature conditions of the blast cell and transmit such sensed conditions to the computer system described herein for further processing. For example, temperature sensors can be positioned near a top vent or vents inside the blast cell where cold air comes into the blast cell. One or more other temperature sensors can be positioned near one or more bottom vents of the blast cell where warmer air is expelled from the blast cell. Temperature values measured where the air comes into the blast cell can correspond to the supply air temperature, which can be processed by the computer system to determine whether components are operating correctly to provide desired cold air temperature values to the blast cell.

The computer system can also determine, based on the sensed conditions, whether the blast cell is operating within a desired temperature range for the particular blast schedule, particular items inside the blast cell, and/or the blast cell more generally. The computer system can also visually present the determination in the module 902B. For example, the computer system can determine whether the sensed conditions are above or otherwise exceed some threshold temperature values or range. If the sensed conditions are above or exceed the threshold, then the computer system can visually present an indication in the module 902B that the temperature inside the blast cell is not as desired to freeze or otherwise cool the items placed therein.

The module 902B can also include a warning indicator 910. In some implementations, the warning indicator 910 can blink, become highlighted, glow, and/or be presented in a different indicia (e.g., color, pattern) when the Cell 3 is malfunctioning or has some type of error. For example, the warning indicator 910 can blink or flash when the Cell 3 is experiencing a hardware malfunction. As a result, the user can become informed about the issue to address it quickly and efficiently. The computer system described herein can receive signals from sensors in the facility and/or in the Cell 3 indicating that an error or other type of malfunction has been detected. Upon receiving those signals, the computer system can update a visual appearance of the warning indicator 910 in real-time or near real-time to alert the user of the error or other type of detected malfunction.

The warning indicator 910 can also provide information about one or more actions that may need to be taken in order to fix one or more issues with the blast schedule and/or the blast cell, more generally. Sometimes, a pop-out window or other type of notification can be presented in the GUI 900 and/or overlaying information presented in the GUI 900 to alert the user of the error or issue to be addressed for the particular blast cell.

The module 902B can include capacity information 912. The capacity information 912 can indicate how full the corresponding blast cell is. Each blast cell can be configured to receive a same quantity of items. In some implementations, one or more of the blast cells can be configured to receive different quantity of items. As described herein, sometimes the blast cell can operate according to the blast schedule when the blast cell is filled to near capacity or otherwise is not filled to full capacity. The blast cell may operate according to the blast schedule when filled to near capacity based on a product type and/or type of packing around the items placed in the blast cell.

As an illustrative example, the computer system described herein can receive, from scanning devices, product information about the items that are loaded into the blast cell. Using the product information, the computer system can identify a quantity of the items loaded into the blast cell, and then determine whether the quantity of the items (i) satisfies a minimum threshold capacity for operating the blast cell and/or (ii) is within a maximum threshold capacity for operating the blast cell. The computer system can generate instructions to cause the blast cell to begin operating based on a determination that the quantity of the items (i) satisfies the minimum threshold capacity and/or (ii) is within the maximum threshold capacity. The computer system can also start the countdown timer 908 based on an indication that the instructions are executed to cause the blast cell to begin operating. The computer system can update, in the GUI 900, the countdown timer 908 in real-time and once the countdown timer starts.

Any of the modules 902A-N can include any combination of the information described herein.

In some implementations, the user can select or click on any of the modules 902A-N presented in the GUI 900 to view additional information about the corresponding blast cell, as described and illustrated in reference to at least FIGS. 4A and 4B.

FIG. 9B illustrates another example GUI 920, which is similar to at least the GUIs 400 in FIG. 4A, 420 in FIG. 4B, and 900 in FIG. 9A. For example, the GUI 920 can include a menu 922, from which the user can select a facility for viewing the related blast cell information. The GUI 920 can include selectable options 924 and 926 to toggle between viewing live blast cell information (option 924) and logged information about the blast cells (option 926). Moreover, the GUI 920 can present modules 923A-N, where each of the modules 923A-N can provide information about respective blast cells in the user-selected facility. Refer to at least FIGS. 4A, 9A, and 9C for further discussion about the information presented in the modules 923A-N.

The GUI 920 may also present relevant alerts 928 for user review and/or action. The alerts 928 may correspond to detected conditions of one or more blast cells associated with the user-selected facility. In the example of FIG. 9B, the alerts 928 indicate that an operational temperature of Cell 5 is currently out of an acceptable temperature range and that action should be taken. The alerts 928 can sometimes include selectable options for taking action, such as contacting a relevant user and/or generating controls to be executed to remediate the detected conditions. Sometimes, one or more other alerts can be presented as visual indications in the modules 923A-N (e.g., check temperature, turn off, unload, incomplete, turn on). Sometimes, the alerts can be presented in different indicia (e.g., color, pattern) to visually indicate an urgency of the alert to be addressed. For example, if a supply temperature is not as expected or within an acceptable range, as shown in the module 923A, then a visual indicator to check the temperature can be shown in a red indicia, the supply temperature information can be shown in the same red indicia, and/or the module 923A itself can be bordered/highlighted with the same red indicia. The use of the red indicia can draw the user's attention to the particular module 923A and concerns that may need to be addressed for the related blast cell.

As another example, the module 923B can be presented in a different indicia (e.g., orange) to visually indicate that the blast cell operations should be checked but that it has not yet reached a matter of urgency. In the example of FIG. 9B, a blast cycle in the blast cell corresponding to the module 923B has been paused for at least 7 seconds. As the idle time continues to increase, a freeze process for the particular products in that blast cell can be negatively impacted. Threshold ranges of acceptable idle time can be determined and used for the particular products to determine whether the idle time is too long or is still okay/safe for the product quality. Here, 7 seconds of idle time, especially in light of the cycle still requiring 8 minutes and 5 seconds before completion, can be reaching upper threshold ranges of idle time for the particular products. Thus, the module 923B can be presented with the different indicia (e.g., orange), a timer or other visual element indicating the idle time may also be presented in the different indicia. In some implementations, the module 923B may also include an indicator to turn on the blast cell cycle. The indicator may also be presented in the different indicia.

As yet another example, the module 923N can be presented in a third indicia (e.g., blue) or a normal indicia to visually indicate that the blast cycle is going as expected for the related blast cell and there are no issues or concerns to be addressed. One or more visual elements in the module 923N may also be presented in the third indicia. In the other modules 923A and/or 923B, the third indicia may also be applied to visual elements that correspond to operations or conditions that are as expected (e.g., within expected threshold ranges for the respective blast cells, products, customers, blast cycles).

The GUI 920 can include a page indicator 925, which can be selected by the user to toggle between viewing different blast cell modules in the GUI 920. The page indicator 925 can also indicate how many pages of blast cells can be viewed in the GUI 920. In some implementations, the user can provide input, such as vertical or horizontal scrolling input in the GUI 920 in order to view all or different blast cells in the GUI 920.

FIG. 9C illustrates another example GUI 930 for presenting information about blast cells in a facility. The GUI 930 contains one or more visual/graphical elements that are similar to visual and/or graphical elements in the GUI 900 described in reference to FIG. 9A and the GUI 920 in FIG. 9B.

The GUI 930 can include a plurality of cards 934A-N, each of the cards 934A-N providing information about a blast cell in a facility. The cards 934A-N may not be user-selectable. In some implementations, a user can select one of the cards 934A-N to view additional or other information about the corresponding blast cell. The additional or other information can be presented in another GUI, a notification, and/or a pop-out window that overlays at least a portion of the information shown in the GUI 930. The plurality of cards 934A-N can be the same as or similar to the modules 408A-N, 422A-N, 902A-N, and 923A-N described in FIGS. 4A, 4B, 9A, and 9B, respectively.

The GUI 930 can also include a selectable option 932, which the user can use to select for which site or facility to view the cards 934A-N. User input indicating selection of a particular site or facility from the option 932 (e.g., a drop down menu, a search input field, a menu) can cause the computing systems described herein to update the GUI 930. Updating the GUI 930 can include populating the cards 934A-N with information corresponding to each blast cell in the user-selected site or facility.

In some implementations, additional or fewer cards 934A-N may be presented in the GUI 930. The quantity of cards 934A-N presented in the GUI 930 can vary based on how many blast cells are located in the site or facility.

Information presented in the cards 934A-N for each of the blast cells can be updated in real-time or near real-time as corresponding data is generated and transmitted using the disclosed computing systems. Each of the cards 934A-N can present information such as a countdown timer 936, an action timer 938, blast cell identifying information 940, one or more signals 942, a capacity 944, and a supply temperature 946 to the blast cell.

The countdown timer 936 can indicate how much time remains during a current blast cell cycle/freezing operation. Sometimes, the countdown timer 936 can having an indication indicating that the blast cell is empty, such as shown in the card 934C for blast cell 3. The countdown timer 936 for blast cell 3 therefore indicates that the blast cell 3 does not contain any products for freezing and therefore is not currently operating.

The action timer 938 can indicate how long the current blast cell has been paused, sitting idle, and/or an action needs to be taken. In the example card 934A, corresponding blast cell 1 has had 100 minutes of idle time since the blast cell cycle has ended, according to the action timer 938. In the example card 934B, corresponding blast cell 2 has been paused for 47 seconds while 12 minutes remain for the blast cell cycle. In the example card 934D, corresponding blast cell 4 has a load time of approximately 32 seconds.

The blast cell identifying information 940 can include an identifier for the corresponding blast cell (e.g., cell 1, cell 2, cell 3, etc.), a cell state (e.g., on, off, defrost), and/or a product type (e.g., item type) that is inside the blast cell or otherwise assigned to the blast cell.

In some implementations, the blast cell identifying information 940 can be presented in one or more visual indicia to indicate a status of operations in the facility. For example, the information 940 can be presented in a different indicia based on one or more of the signals 942 that are also generated and visualized in the cards 934A-N. For example, when an alert or warning signal is shown in the cards 934A-N, the corresponding information 940 can be presented in a red color to bring the user's attention to the blast cell having the alert or warning signal. As another example, then everything is on track for the particular blast cell, the corresponding information 940 can be presented in a green color.

The signals 942 can indicate when and/or what actions may need to be taken for a particular blast cell depicted in the cards 934A-N. The signals 942 can include text indicating the action(s) and/or one or more visual indicia indicating whether the signals 942 require action or merely present information. The text for the signals 942 can instruct, as illustrative examples, the user to turn off the blast cell, unload the products from the blast cell, check a temperature of the blast cell, or perform other required actions. The text for the signals 942 can also include positive or neutral information, such as an indication that the blast operations for the blast cell are on track (and thus the user does not need to take any action at a present or current time). The visual indicia can include colors, patterns, textures, and/or graphical elements indicating whether the signal 942 is a required action/warning/alert or not. For example, for required actions (e.g., turn off, unload), the signal 942 can be presented in a red color with an encircled exclamation point. As another example, for warnings or alerts (e.g., check temperature), the signal 942 can be presented in a red color with an exclamation point inside a triangle. For other types of notifications (e.g., on track), the signal 942 can be presented in a green color with a thumbs up icon. One or more other visual indicia can be used to demonstrate what type of action, if any, is required by the displayed signal 942.

The capacity 944 can indicate how many boxes of products, cases of products, and/or pallets of products are currently loaded in the respective blast cell. In some implementations, the capacity 944 can indicate how many rows, levels, racks, and/or positions inside the blast cell are occupied by boxes, cases, and/or pallets for blast freezing. Each of the blast cells can have a predetermined maximum capacity. In the example of FIG. 9C, each blast cell represented by the cards 934A-N has a maximum capacity of 30. In some implementations, one or more of the blast cells may have different maximum capacities, which can depend on a size and/or arrangement of the blast cell. The different maximum capacities may also depend, in some implementations, on types/sizes of products/pallets that can be received in the blast cells (e.g., some blast cells may be configured to receive taller and/or larger pallets of products, which can cause such blast cells to have smaller maximum capacities than other blast cells that may be configured to receive many small pallets or individual boxes/cases). Moreover, as shown in FIG. 9C, sometimes a blast cell can be operated even when the maximum capacity is not reached. Various factors and/or data can be analyzed by the disclosed computing systems to determine whether to run a blast cell when the maximum capacity is not reached.

The supply temperature 946 can indicate a current temperature of air that is supplied to the respective blast cell. The supply temperature 946 can be measured by sensors along an air pathway going into the blast cell. The supply temperature 946 can be updated in real-time or near real-time, such as at predetermined time intervals (e.g., every 5 seconds, 10 seconds, 30 seconds, 1 minute, 3 minutes, 5 minutes, 10 minutes, etc.).

In some implementations, the GUIs described in reference to FIGS. 4A, 4B, 9A, 9B, and 9C can present additional or other information. For example, the GUIs can present blast cell scheduling information by load or by product (e.g., item). The GUIs can present information about incoming loads, unloading loads, and done loads as tables, graphical elements, and/or visual elements. For each of the loads, information such as a name of the load, a total quantity of pallets for the load, an appointment time (e.g., time that is slotted for the load to be blasted), and/or a blast cell assignment can be presented. Any of the information presented in the GUIs can be based on data received from third-party systems, such as customer computing system, a shipment or other delivery computing system, another warehouse, a warehouse management system (WMS), etc.

Each of the incoming loads, as an illustrative example, can have different (or same, similar) appointment times, which can vary based on appointment availability at the facility for the blast cells, amount of space available in the blast cells to receive each of the loads, expected amount of time that each of the loads would be required to undergo a blast freezing process, expected delivery time to the respective customer(s) of the loads, and/or when the incoming loads actually arrive at or expected to arrive at the facility. The appointment times can be determined automatically by the computer system described herein. For example, the computer system can perform the techniques described in reference to FIGS. 1-3 to determine optimized blast schedules. Based on those determined blast schedules, the computer system can automatically assign each of the incoming loads to appointment times. In some implementations, the appointment times can be selected and/or adjusted by a relevant user, such as an operator of the blast cells at the facility and/or a particular customer of one or more of the incoming loads. Sometimes, the computer system described herein may automatically determine a blast cell assignment for each load. In some implementations, the dashboard can present user-interactable data fields or options that allow the relevant user to manually select and assign a load to a particular blast cell.

In some implementations, the computer system can determine blast cell assignment recommendations based on a variety of factors/data described above and using the techniques described herein. The recommendations can include, for example, one or more blast cells to which a load can be assigned. In some implementations, the recommendation can include assigning all or a portion of the loads to a same blast cell so that only one blast cell is filled to capacity or near capacity and operated to efficiently blast freeze the loads placed therein. The recommendations can be made based on a variety of factors, including but not limited to appointment availability at the facility for the blast cells, amount of space available in the blast cells to receive loads, expected amount of time that each of the loads would be required to undergo a blast freezing process, and/or expected delivery time to the respective customer(s) of the loads. The relevant user may select one or more of the recommended blast cells for each of the loads. In some implementations, the computer system may automatically assign one or more of the loads to particular blast cells.

In yet some implementations, the GUIs described herein can include information about incoming known loads and/or incoming unknown loads. Such information may include, but is not limited to, a name, identifier, or customer, total quantity of pallets, appointment time, and/or assigned door. The GUIs may additionally or alternatively present information indicating which loads are awaiting blast cell assignments. Each of these loads may include additional information such as a dwell time, which may be taken into consideration by the computer system described herein or relevant users to prioritize assigning the respective load to a blast cell.

Sometimes, the computer system can generate and provide in the GUIs described herein a plan utilization metric for a particular facility. This metric can indicate how efficient the facility is, such as whether the facility is optimizing on available energy and labor to reduce costs and timely complete operations. The metric can be presented as a graphical element indicating utilization or performance. For example, the graphical element can be displayed in a first color/indicia that corresponds to a plan utilization that exceeds a first threshold value. The first color can be green. The graphical element can be displayed in a second color that corresponds to plan utilization that is less than the first threshold value but greater than a second threshold value. The second color can be yellow or orange. The graphical element can be displayed in a third color that corresponds to plan utilization that is less than the second threshold value. The third color can be red. One or more other colors, indicia, and/or threshold values, levels, or ranges can be used to visually depict the plan utilization in the facility.

In some implementations, the GUIs described herein may include one or more selectable options (e.g., controls, buttons) to provide manual intervention of blast cell operations by a relevant user in the facility. The options can include pausing a current blast cycle, stopping the current blast cycle, proposing a new or updated schedule, etc. User selection of any of these options can cause instructions to be transmitted to an RCS or other controller in the facility that, when executed, cause the RCS or other controller to automatically adjust the respective blast cell. Whenever the user selects any of these options, the GUI can also be updated in real-time to reflect a change in status to the respective blast cell.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A system for controlling a blast cell based on a blast freezing optimization schedule, the system comprising:
- a blast cell configured to receive items to be cooled;
- a refrigeration control system (RCS) comprising a controller, the controller being configured to control operation of the blast cell to cool the items received in the blast cell; and
- a computer system in communication with the RCS, wherein the computer system is configured to perform operations comprising:
  - receiving storage facility data;
  - determining a blast schedule for the blast cell based on applying a simulation model to the storage facility data, wherein the simulation model is trained to generate the blast schedule based on determining that a blast cell cost per pallet maximizes a blast profit margin for the storage facility by at least a threshold amount, wherein the blast profit margin is a numeric value that indicates blast freeze operation efficiencies for a facility; and
  - returning the blast schedule for execution by the controller of the RCS to cause the controller to control components associated with the blast cell according to the blast schedule, wherein returning the blast schedule comprises transmitting the blast schedule to a computing device of a worker in the storage facility, wherein the computing device is configured to:
  - output the blast schedule in a GUI display at the computing device;
  - receive user input indicating selection of the blast schedule; and
  - transmit a notification to the computer system indicating the user selection of the blast schedule,
- wherein the computer system performs operations further comprising:
  - generating instructions to control the blast cell according to the user selection of the blast schedule; and
  - returning the instructions to the controller of the RCS to cause the controller to automatically control operations of the blast cell based on the user selection of the blast schedule.

2. The system of claim 1, wherein the storage facility data includes energy rates, labor costs, pallet movement data, refrigeration data, and blast cell data.

3. The system of claim 1, wherein the operations further comprise:
- generating activation instructions for the blast cell based at least in part on the storage facility data; and
- transmitting the activation instructions to the RCS, wherein the RCS is configured to automatically execute the activation instructions to control the blast cell according to the activation instructions.

4. The system of claim 1, wherein the operations further comprise:
- generating instructions to deactivate the blast cell based on a determination, by the simulation model, that the blast cell cost per pallet maximizes the blast profit margin for the storage facility by less than the threshold amount; and
- transmitting the instructions to a user device for presentation in a graphical user interface (GUI) display, wherein the user device is configured to:

present the instructions with selectable options to (i) perform the instructions and (ii) reject the instructions;

receive user input indicating selection of one of the selectable options; and transmit the user input to the computer system for automatic execution.

5. The system of claim 1, wherein the operations further comprise:

determining the blast cell cost per pallet based on:

receiving time series data that includes, for a past period of time, pallet movement data, changes in temperature data, labor usage data, and energy consumption data;

correlating the time series data;

determining a cost per pallet over the past period of time based on applying a cost model to the correlated data; and determining the blast cell cost per pallet over a future period of time based on applying a cost projection model to the determined cost per pallet over the past period of time.

6. The system of claim 1, wherein returning the blast schedule further comprises presenting the blast schedule in a GUI display at a user device based on presenting a module designating the blast cell that includes:

(i) a countdown timer indicating an amount of time left in a current blast cycle for the blast cell, (ii) an action timer indicating an amount of time that the blast cell is paused or an action needs to be taken, (iii) a state of the blast cell, the state including at least one of on, off, or defrost, (iv) a product type in the blast cell, (vi) a supply temperature to the blast cell, and (vii) a capacity of the blast cell.

7. The system of claim 6, wherein the module presents information that further includes a graphical element indicating a warning signal when action is required for the blast cell, wherein the warning signal corresponds to instructions, that when executed by the controller of the RCS, cause the controller to (i) control the components to turn off the blast cell or (ii) instruct automated machines in the facility to unload the items from the blast cell.

8. The system of claim 6, wherein the module presents information that further includes a capacity of the blast cell, wherein the operations further comprise:

receiving, from scanning devices, product information about the items that are loaded into the blast cell;

identifying, based on the product information, a quantity of the items loaded into the blast cell;

determining whether the quantity of the items (i) satisfies a minimum threshold capacity for operating the blast cell and (ii) is within a maximum threshold capacity for operating the blast cell;

generating instructions for execution by the controller of the RCS to cause the blast cell to begin operating based on a determination that the quantity of the items (i) satisfies the minimum threshold capacity and (ii) is within the maximum threshold capacity;

starting the countdown timer based on an indication that the instructions are executed, by the controller of the RCS; and updating, in the GUI display at the user device and in real-time, the countdown timer once the countdown timer starts.

9. The system of claim 6, wherein:

the blast cell comprises a plurality of blast cells, and the user device is configured to present, in another GUI display, a plurality of the modules, wherein each of the plurality of modules corresponds to a respective blast cell amongst the plurality of blast cells and is configured to present blast cycle operational information corresponding to the respective blast cell.

* * * * *